(12) United States Patent
Ishii

(10) Patent No.: US 10,520,368 B2
(45) Date of Patent: Dec. 31, 2019

(54) ELECTRONIC APPARATUS AND SURFACE TEMPERATURE ESTIMATION METHOD THEREFOR

(71) Applicant: FUJITSU LIMITED, Kawasaki-shi, Kanagawa (JP)

(72) Inventor: Masatoshi Ishii, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 284 days.

(21) Appl. No.: 15/723,226

(22) Filed: Oct. 3, 2017

(65) Prior Publication Data

US 2018/0136051 A1 May 17, 2018

(30) Foreign Application Priority Data

Nov. 16, 2016 (JP) .................................. 2016-222827

(51) Int. Cl.
G01K 7/25 (2006.01)
G01K 1/20 (2006.01)

(52) U.S. Cl.
CPC ........ *G01K 7/25* (2013.01); *G01K 1/20* (2013.01)

(58) Field of Classification Search
CPC .. G01K 1/20; G01K 7/25; G01K 7/42; G01K 7/427; H01L 21/67248; H01L 21/67253; H01L 22/12; B24B 37/013
See application file for complete search history.

(56) References Cited

U.S. PATENT DOCUMENTS 6,033,922 A * 3/2000 Rowland ............... B24B 37/013
257/E21.528
6,634,177 B2 * 10/2003 Lin ......................... F25B 21/02
62/161

(Continued)

FOREIGN PATENT DOCUMENTS

JP 9-159541 6/1997
JP 2010-276074 12/2010
(Continued)

OTHER PUBLICATIONS

Masatoshi Ishii et al., "Development of the Algorithm for Smartphone Surface Temperature Estimation with a Thermal Transfer Function Model", Academic papers from the 30th Spring meeting of the Japan Institute of Electronics Packaging, pp. 212-215, Mar. 22, 2016 (14 pages).

*Primary Examiner* — Elias Desta
(74) *Attorney, Agent, or Firm* — Fujitsu Patent Center

(57) ABSTRACT

An electronic apparatus includes a housing, a substrate in the housing, components on the substrate, a reference temperature sensor, temperature sensors for the respective components, and an arithmetic processing unit. The arithmetic processing unit estimates an outside air temperature by using a reference temperature, temperatures acquired by the temperature sensors, first transfer functions, second transfer functions, and third transfer functions, and estimates a surface temperature of the housing based on the outside air temperature. Each first transfer function is defined based on a thermal resistance and a thermal time constant from a component to the reference temperature sensor. Each second transfer function is defined based on a thermal resistance and a thermal time constant from a component to an individual temperature sensor. Each third transfer function is defined based on a thermal resistance and a thermal time constant from a component to a surface of the housing.

8 Claims, 16 Drawing Sheets

(56) References Cited

U.S. PATENT DOCUMENTS

| | | | |
|---|---|---|---|
| 7,445,726 B2 * | 11/2008 | Wang | H01L 21/0274 156/345.24 |
| 8,510,070 B2 * | 8/2013 | Makinen | G01K 1/20 702/130 |
| 9,846,086 B1 * | 12/2017 | Robinson | G01K 3/04 |
| 2007/0067136 A1 | 3/2007 | Conroy et al. | |
| 2015/0003491 A1 | 1/2015 | Matsumoto | |

FOREIGN PATENT DOCUMENTS

| | | |
|---|---|---|
| JP | 2012-074064 | 4/2012 |
| JP | 2015-010873 | 1/2015 |

* cited by examiner

CPU CONTROL TABLE ── 44

| LIMIT STEPS | CLOCK FREQUENCIES |
|---|---|
| 0 | 2.0 GHz |
| 1 | 1.8 GHz |
| 2 | 1.6 GHz |
| 3 | 1.4 GHz |
| 4 | 1.2 GHz |
| 5 | 1.0 GHz |

FIG. 11

ELECTRONIC APPARATUS AND SURFACE TEMPERATURE ESTIMATION METHOD THEREFOR

CROSS-REFERENCE TO RELATED APPLICATION

This application is based upon and claims the benefit of priority of the prior Japanese Patent Application No. 2016-222827, filed on Nov. 16, 2016, the entire contents of which are incorporated herein by reference.

FIELD

The embodiments discussed herein relate to an electronic apparatus and a surface temperature estimation method therefor.

BACKGROUND

These days, electronic apparatuses such as smartphones, tablet terminals, and notebook personal computers (PCs) are widely used, and functions and capabilities of these electronic apparatuses are improved day by day. With these advances, components such as processors and radio interfaces included in the electronic apparatuses generate more heat. However, it is not easy to improve the cooling capabilities of these electronic apparatuses due to their shape constraints. Thus, when a component is used in a high load condition for a long time, the component could not be cooled sufficiently. In this case, the heat could be transferred from the component to the surface of the housing of the electronic apparatus, and the surface temperature could increase.

One way to drop the surface temperature is to limit the operation level of the component when the surface temperature of the housing exceeds a threshold. For example, it is possible to drop the surface temperature by decreasing the operation speed of a processor or the communication speed of a radio interface. However, there are cases in which it is difficult to arrange a temperature sensor for directly measuring the surface temperature near the surface of the housing, due to the constraint on the shape of the housing. To solve this problem, the surface temperature may indirectly be estimated from measured data such as internal temperatures of the electronic apparatus.

For example, there has been proposed a housing surface temperature estimation method in which the surface temperature of a housing is estimated by using a temperature measured by a temperature sensor near a heat source and transfer functions. According to this proposed housing surface temperature estimation method, a transfer function representing the heat transfer from the heat source to the temperature sensor and a transfer function representing the heat transfer from the heat source to the surface of the housing are defined on the basis of a thermal circuit model including a thermal resistance and a thermal time constant. More specifically, by applying the two kinds of transfer function to the difference between the temperature measured by the temperature sensor and a reference temperature measured by a reference temperature sensor arranged far from the heat source, a surface temperature increase amount by the heat transfer from the heat source is estimated. Next, the surface temperature is calculated from the surface temperature increase amount and the reference temperature.

In addition, for example, there has been proposed a printer apparatus that estimates the ambient temperature of the housing by using a temperature sensor arranged in the housing storing a heat-generating component. The proposed printer apparatus assumes that the difference between a temperature measured by the temperature sensor and the ambient temperature falls within a certain range after a certain time elapses from power activation. Based on this assumption, the printer apparatus estimates the ambient temperature from the temperature measured by the temperature sensor and the elapsed time from power activation.

In addition, for example, there has been proposed a component temperature estimation apparatus that estimates the temperature of a component arranged a certain distance away from a heat source included in a vehicle. The proposed component temperature estimation apparatus calculates the temperature of the heat source and estimates the temperature of the component from the temperature of the heat source, the degree of the heat transfer from the heat source to the component, and the operating state of the component. In addition, for example, there has been proposed a data processing system that predicts change of the temperature of a processor from the ambient temperature, the current temperature of the processor, and the current operating state of the processor and changes the operating state of the processor on the basis of the predicted change of the processor temperature.

In addition, for example, there has been proposed a storage apparatus that controls a cooling fan on the basis of the ambient temperature. The proposed storage apparatus acquires a value of a first temperature sensor that measures the temperature of a heat-generating component and a value of a second temperature sensor that is arranged near the heat-generating component and that measures the outside air temperature of the storage apparatus. The storage apparatus calculates a correction value from the value of the first temperature sensor, the value of the second temperature sensor, and elapsed time and corrects the value of the second temperature sensor by using the correction value. See, for example, the following documents:

Japanese Laid-open Patent Publication No. 09-159541;
Japanese Laid-open Patent Publication No. 2010-276074;
Japanese Laid-open Patent Publication No. 2012-74064;
Japanese Laid-open Patent Publication No. 2015-10873; and ISHII Masatoshi, NAKASHIMA Yoshiyasu, TAKAMOTO Kenshi, "Development of the Algorithm for Smartphone Surface Temperature Estimation with a Thermal Transfer Function Model", Academic papers from the 30th Spring meeting of the Japan Institute of Electronics Packaging, pp. 212-215, Mar. 22, 2016

The above housing surface temperature estimation method assumes that the reference temperature measured by the reference temperature sensor is the same as or sufficiently close to the outside air temperature of the housing. However, due to the constrain on the shape of the housing, depending on the location of the reference temperature sensor, the reference temperature measured could be affected by the heat generated by the heat source. For example, since a heat source and a reference temperature sensor in a small electronic apparatus needs to be arranged close to each other, the reference temperature measured could be affected by the heat generated by the heat source. In this case, there is a problem that the estimation accuracy of the surface temperature is deteriorated.

SUMMARY

According to one aspect, there is provided an electronic apparatus including: a housing; a substrate that is arranged in the housing; a plurality of components that are arranged on the substrate; a reference temperature sensor that is arranged on the substrate and acquires a reference temperature; a plurality of temperature sensors that are arranged for the plurality of components on the substrate and acquire temperatures, respectively; and a processor that estimates an outside air temperature by using the reference temperature, the plurality of temperatures acquired by the plurality of temperature sensors, a plurality of first transfer functions each of which is defined based on a thermal resistance and a thermal time constant from a corresponding one of the plurality of components to the reference temperature sensor, a plurality of second transfer functions each of which is defined based on a thermal resistance and a thermal time constant from a corresponding one of the plurality of components to an individual temperature sensor, and a plurality of third transfer functions each of which is defined based on a thermal resistance and a thermal time constant from a corresponding one of the plurality of components to a surface of the housing and estimates a surface temperature of the housing based on the outside air temperature.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 illustrates an example of a central processing unit (CPU) control table;

DESCRIPTION OF EMBODIMENTS

Figure 1:
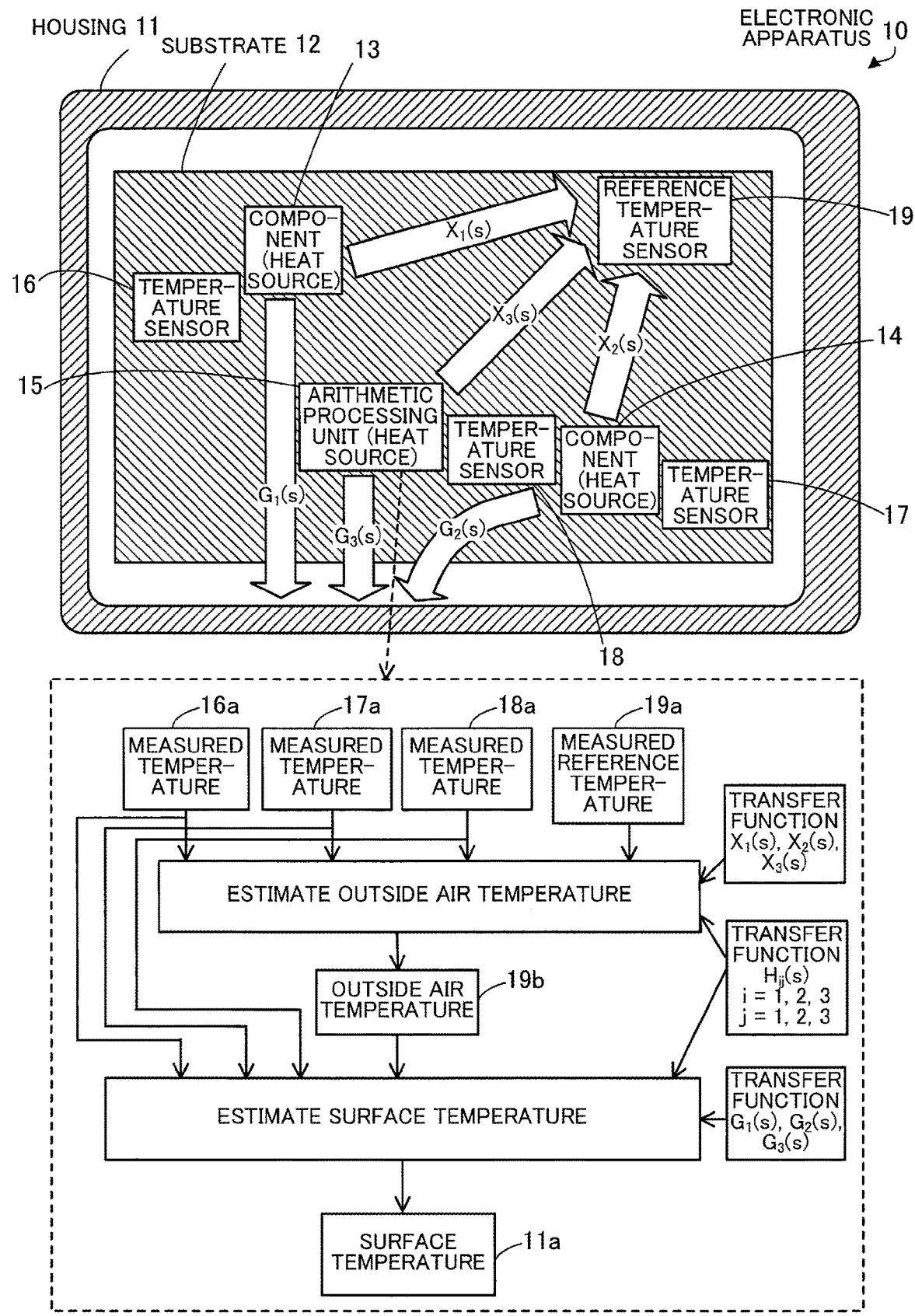
FIG. 1 illustrates an example of an electronic apparatus according to a first embodiment.

Hereinafter, embodiments will be described with reference to the accompanying drawings, wherein like reference characters refer to like elements throughout.

First Embodiment

A first embodiment will be described.

FIG. 1 illustrates an example of an electronic apparatus according to the first embodiment.

This electronic apparatus 10 according to the first embodiment is an apparatus having a surface touchable by humans. For example, the electronic apparatus 10 is a mobile terminal apparatus such as a smartphone, a portable telephone, a personal digital assistant (PDA), a tablet terminal, or a notebook computer. The electronic apparatus 10 estimates the current temperature of the surface, and when the surface temperature is high, the electronic apparatus 10 controls a component so that the surface temperature will drop (for example, the electronic apparatus 10 drops the processing speed of the component).

The electronic apparatus 10 includes a housing 11, a substrate 12, a plurality of components including components 13 and 14, an arithmetic processing unit 15, a plurality of temperature sensors including temperature sensors 16 to 18, and a reference temperature sensor 19.

The substrate 12 is arranged inside the housing 11. The components 13 and 14, the arithmetic processing unit 15, the temperature sensors 16 to 18, and the reference temperature sensor 19 are arranged on the substrate 12. In the example in FIG. 1, the arithmetic processing unit 15 is arranged on the substrate 12 as one of the components (heat sources). However, the arithmetic processing unit 15 may be arranged anywhere, as long as the arithmetic processing unit 15 is arranged inside the housing 11.

The components 13 and 14 are components that generate a relatively large amount of heat among the plurality of components of the electronic apparatus 10. Examples of the components 13 and 14 include processors such as a central processing unit (CPU), a digital signal processor (DSP), and a graphics processing unit (GPU), a charging circuit, and a power amplifier such as a radio interface. While FIG. 1 illustrates a total of 3 heat-generating components including the arithmetic processing unit 15, the electronic apparatus 10 may include four or more components.

The temperature sensors 16 to 18 are electronic components that measure (acquire) the temperatures at their respective locations. Examples of the temperature sensors 16 to 18 include thermistors. The temperature sensors 16 and 17 are arranged to correspond to the components 13 and 14, respectively, and the temperature sensor 18 is arranged to correspond to the arithmetic processing unit 15. For example, the temperature sensor 16 is arranged closest to the component 13 among the components. Likewise, the temperature sensor 17 is arranged closest to the component 14 among the components. Likewise, the temperature sensor 18 is arranged closest to the arithmetic processing unit 15 among the components. While FIG. 1 illustrates the three temperature sensors 16 to 18, the electronic apparatus 10 may include four or more temperature sensors that correspond to four or more components, respectively.

The reference temperature sensor 19 is an electronic component that measures (acquires) the temperature (reference temperature) at the location thereof. Examples of the reference temperature sensor 19 include a thermistor. The reference temperature sensor 19 is arranged farther away from the heat-generating components 13 and 14 and arithmetic processing unit 15 than the temperature sensors 16 to 18 are. It takes time before change of the temperature of a heat source affects the temperature measured by the reference temperature sensor 19. This period of time will hereinafter be referred to as "delay time." The delay time of the reference temperature sensor 19 is longer than that of any of the temperature sensors 16 to 18. Namely, the thermal time constant of the reference temperature sensor 19 is larger than that of any of the temperature sensors 16 to 18.

The arithmetic processing unit 15 estimates an outside air temperature 19b on the basis of measured temperatures 16a, 17a, and 18a acquired by the respective temperature sensors 16 to 18 and a measured reference temperature 19a acquired by the reference temperature sensor 19. In addition, the arithmetic processing unit 15 estimates a surface temperature 11a at a predetermined location on the surface of the housing 11 on the basis of the measured temperatures 16a to 18a acquired by the respective temperature sensors 16 to 18 and the estimated outside air temperature 19b.

The arithmetic processing unit 15 is a processor such as a CPU or a DSP, for example. Alternatively, the arithmetic processing unit 15 may include an electronic circuit for specific use, such as an application specific integrated circuit (ASIC) or a field programmable gate array (FPGA). The processor executes programs stored in a memory such as a random access memory (RAM). The programs include a surface temperature calculation program in which processing described below is written. A plurality of processors (multiprocessor) will be referred to as a "processor," as needed.

The arithmetic processing unit 15 acquires the measured temperatures 16a to 18a and the measured reference temperature 19a. Next, the arithmetic processing unit 15 estimates (calculates) the outside air temperature 19b by using a plurality of transfer functions $X_1(s)$, $X_2(s)$, and $X_3(s)$ and a plurality of transfer functions $H_{ij}(s)$ (i=1, 2, or 3 and j=1, 2, or 3) previously defined, wherein "s" denotes a frequency-domain variable.

The transfer function $X_1(s)$ is a transfer function defined on the basis of a thermal resistance and a thermal time constant from the component 13 to the reference temperature sensor 19. The transfer function $X_2(s)$ is a transfer function defined on the basis of a thermal resistance and a thermal time constant from the component 14 to the reference temperature sensor 19. The transfer function $X_3(s)$ is a transfer function defined on the basis of a thermal resistance and a thermal time constant from the arithmetic processing unit 15 to the reference temperature sensor 19. The transfer function $H_{ij}(s)$ is a transfer function defined on the basis of a thermal resistance and a thermal time constant from the j-th component (of the components including the arithmetic processing unit 15) to the i-th temperature sensor. For example, the following description assumes that the components 13 and 14 are the first and second components, respectively, and that the arithmetic processing unit 15 is the third component. In addition, the following description assumes that the temperature sensors 16 and 18 are the first to third temperature sensors, respectively. For example, the transfer function $H_{12}(s)$ in which i=1 and j=2 is a transfer function defined on the basis of a thermal resistance and a thermal time constant from the component 14 to the temperature sensor 16. The values of the thermal resistance and the thermal time constant are stored in a memory of the electronic apparatus 10, for example.

The arithmetic processing unit 15 estimates how much the measured reference temperature 19a has increased by the heat generated by the heat sources by using the measured temperatures 16a to 18a, the transfer functions $X_1(s)$ to $X_3(s)$, and the plurality of transfer functions $H_{ij}(s)$. Next, the arithmetic processing unit 15 estimates the outside air temperature 19b by correcting the measured reference temperature 19a with the increase amount.

The arithmetic processing unit 15 estimates (calculates) the surface temperature 11a by using the estimated outside air temperature 19b, the measured temperatures 16a to 18a, the plurality of transfer functions $G_1(s)$, $G_2(s)$, and $G_3(s)$ previously defined, and the plurality of transfer functions $H_{ij}(s)$ previously defined.

The transfer function $G_1(s)$ is a transfer function defined on the basis of a thermal resistance and a thermal time constant from the component 13 to the surface of the housing 11. The transfer function $G_2(s)$ is a transfer function defined on the basis of a thermal resistance and a thermal time constant from the component 14 to the surface of the housing 11. The transfer function $G_3(s)$ is a transfer function defined on the basis of a thermal resistance and a thermal time constant from the arithmetic processing unit 15 to the surface of the housing 11.

The arithmetic processing unit 15 estimates how much the surface temperature 11a has increased by the heat generated by the heat sources by using the measured temperatures 16a to 18a, the plurality of transfer functions $G_1(s)$ to $G_3(s)$, and the plurality of transfer functions $H_{ij}(s)$. The arithmetic processing unit 15 estimates the surface temperature 11a from a sum of how much the surface temperature 11a has increased in total by the heat generated by the heat sources and the value based on the estimated outside air temperature 19b.

The arithmetic processing unit 15 controls the heat-generating component 13, component 14, or arithmetic processing unit 15 itself on the basis of the estimated surface temperature 11a. For example, when the surface temperature 11a exceeds a predetermined threshold, the arithmetic processing unit 15 controls at least one of the operations of the component 13, the component 14, and the arithmetic processing unit 15 itself so that the surface temperature 11a will drop. When the target component is a processor, the arithmetic processing unit 15 may limit the operation speed of the processor, for example, by lowering the upper limit of the clock frequency of the processor. When the target component is a charging circuit, the arithmetic processing unit 15 may stop the charging intermittently. When the target component is a radio interface, the arithmetic processing unit 15 may limit the communication speed, for example, by lowering the upper limit of the communication speed of the radio interface. The arithmetic processing unit 15 may use a plurality of sets of transfer functions $G_1(s)$ to $G_3(s)$, each set corresponding to a location on the surface of the housing 11. In this way, the arithmetic processing unit 15 calculates the surface temperatures at the respective locations on the surface of the housing 11. For example, of all the plurality of surface temperatures, the arithmetic processing unit 15 compares the maximum surface temperature with a predetermined threshold and controls the component 13, the component 14, or the arithmetic processing unit 15 itself.

The electronic apparatus 10 according to the first embodiment estimates the outside air temperature 19b on the basis of the measured reference temperature 19a, the measured temperatures 16a to 18a, the transfer functions $X_1(s)$ to $X_3(s)$, and the transfer function $H_{ij}(s)$. Next, the electronic apparatus 10 estimates the surface temperature 11a of the housing 11 on the basis of the outside air temperature 19b, the measured temperatures 16a to 18a, the transfer function $H_{ij}(s)$, and the transfer functions $G_1(s)$ to $G_3(s)$.

When the electronic apparatus 10 calculates the surface temperature 11a by assuming the measured reference temperature 19a as the outside air temperature of the housing 11, depending on the location of the reference temperature sensor 19, the measured reference temperature 19a could be affected by the heat generated by a heat source. In this case, the estimation accuracy of the surface temperature 11a is deteriorated. In contrast, since the electronic apparatus 10 uses the measured reference temperature 19a, the measured temperatures 16a to 18a, the transfer functions $X_1(s)$ to $X_3(s)$, and the transfer function $H_{ij}(s)$, the electronic apparatus 10 is able to estimate the outside air temperature 19b while taking the impact of the heat generated by the heat sources on the reference temperature sensor 19 into consideration. In addition, since the electronic apparatus 10 is able to estimate the surface temperature 11a on the basis of the estimated outside air temperature 19b, the electronic apparatus 10 is able to estimate the surface temperature of the housing 11 accurately, regardless of the location of the reference temperature sensor 19 on the substrate 12. Thus, for example, even when the housing 11 is small and the reference temperature sensor 19 is not sufficiently distanced from any of the heat sources (even when the measured reference temperature 19a is affected by a heat source), the estimation accuracy of the surface temperature 11a is improved.

Second Embodiment

Next, a second embodiment will be described.

Figure 2:
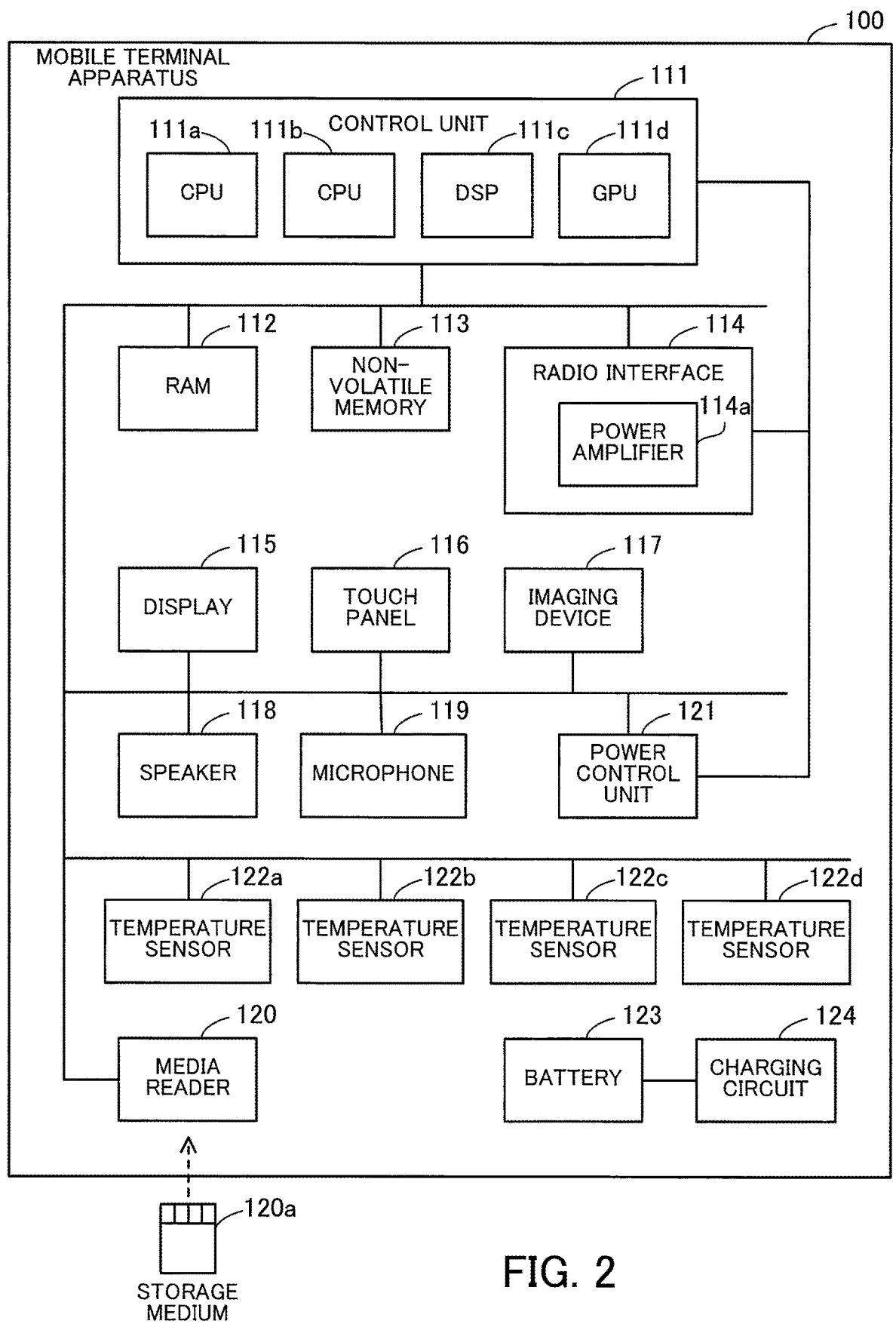
FIG. 2 is a block diagram illustrating a hardware example of a mobile terminal apparatus.

FIG. 2 is a block diagram illustrating a hardware example of a mobile terminal apparatus.

This mobile terminal apparatus 100 according to the second embodiment is a mobile terminal apparatus having a surface touchable by its user. For example, the mobile terminal apparatus 100 is a smartphone, a portable telephone, a PDA, a tablet terminal, or a notebook computer. The mobile terminal apparatus 100 corresponds to the electronic apparatus 10 according to the first embodiment.

The mobile terminal apparatus 100 includes a control unit 111, a RAM 112, a non-volatile memory 113, a radio interface 114, a display 115, a touch panel 116, an imaging device 117, a speaker 118, a microphone 119, and a media reader 120. In addition, the mobile terminal apparatus 100 includes a power control unit 121, temperature sensors 122a to 122d, a battery 123, and a charging circuit 124.

The control unit 111 controls the mobile terminal apparatus 100 and includes CPUs 111a and 111b, a DSP 111c, and a GPU 111d.

The CPUs 111a and 111b are processors including arithmetic circuits that execute program commands. The CPUs 111a and 111b load at least a part of the programs or data stored in the non-volatile memory 113 to the RAM 112 and execute the program. The CPUs 111a and 111b may include a plurality of CPU cores. By using a plurality of CPUs or a plurality of CPU cores, processing according to the second embodiment may be performed in a parallel manner.

The DSP 111c processes digital signals. For example, the DSP 111c processes signals transmitted and received via the radio interface 114. In addition, for example, the DSP 111c processes audio signals outputted from the speaker 118 and audio signals received from the microphone 119. The GPU 111d processes image signals. For example, the GPU 111d generates images displayed on the display 115.

The RAM 112 is a volatile semiconductor memory that temporarily holds programs executed by the CPUs 111a and 111b or data used for arithmetic processing. The mobile terminal apparatus 100 may include a different kind of memory other than a RAM and may include a plurality of memories.

The non-volatile memory 113 is a non-volatile storage device that holds data and software programs such as operating system (OS) programs, middleware programs, and application software programs. The programs include a surface temperature calculation program for estimating the surface temperature of the mobile terminal apparatus 100. As the non-volatile memory 113, for example, a flash memory or a solid state drive (SSD) may be used. The mobile terminal apparatus 100 may include a different kind of non-volatile storage device such as a hard disk drive (HDD).

The radio interface 114 is a communication interface that communicates with other communication apparatuses such as base stations or access points via radio links. Alternatively, the mobile terminal apparatus 100 may include a wired interface that communicates with other communication apparatuses such as switches or routers via cables. Alternatively, for example, the radio interface 114 may include a near-field communication function such as Bluetooth (registered trademark). The radio interface 114 includes a power amplifier 114a that amplifies signals transmitted. As needed, the power amplifier 114a will hereinafter be referred to as an amplifier or a high power amplifier (HPA).

The display 115 displays images in accordance with commands from the control unit 111. Examples of the display 115 include a liquid crystal display (LCD) and an organic electro-luminescence (OEL) display.

The touch panel 116 is arranged on the display 115 and detects a user's touch operation on the display 115. For example, when a user touches a portion on the touch panel 116 with his or her finger or a touch pen, the touch panel 116 detects the contact location and notifies the control unit 111 of the location detected. To detect the location, the touch panel 116 may use a matrix switch method, a resistive touch method, a surface acoustic wave method, an infrared ray method, an electromagnetic induction method, a capacitance method, or the like. The mobile terminal apparatus 100 may include another input device such as a keypad. For example, a keypad includes one or a plurality of input keys. When the user presses an input key, the keypad detects this user operation and notifies the control unit 111 of the pressing of the input key.

The imaging device 117 captures still images or moving images. For example, a charge coupled device (CCD) sensor or a complementary metal-oxide-semiconductor (CMOS) sensor may be used as an imaging sensor. The imaging device 117 stores image data indicating captured images in the RAM 112 or the non-volatile memory 113.

The speaker 118 acquires electrical signals as audio signals from the control unit 111 and reproduces sound by converting the electrical signals into physical signals. For example, when the user is talking with a person on the mobile terminal apparatus, this person's voice and background noise are reproduced. The microphone 119 converts physical signals of sound into electrical signals and outputs the electrical signals as audio signals to the control unit 111. For example, when the user is talking on the mobile terminal apparatus, the user's voice and background noise are inputted from the microphone 119.

The media reader 120 is a reading device that reads programs and data stored in a storage medium 120a. For example, a flash memory, a magnetic disk such as a flexible disk (FD) or an HDD, an optical disc such as a compact disc (CD) or a digital versatile disc (DVD), or a magneto-optical disk (MO) is used as the storage medium 120a. The media reader 120 stores the programs and data read from the storage medium 120a in the RAM 112 or the non-volatile memory 113.

The power control unit 121 changes the operation levels of the control unit 111 and the radio interface 114 to control the power consumptions of the control unit 111 and the radio interface 114. When operating at higher operation levels, these components consume more power and generate more heat. For example, the power control unit 121 changes the clock frequency of the CPUs 111a and 111b. When operating at a higher clock frequency, the CPUs 111a and 111b offer higher arithmetic performance, thereby consuming more power and generating more heat. Alternatively, for example, the power control unit 121 changes the communication speed of the radio interface 114. When the radio interface 114 operates at a higher communication speed, the power amplifier 114a consumes more power and generates more heat.

The temperature sensors 122a to 122d measure the temperatures where they are located. For example, thermistors are used as the temperature sensors 122a to 122d. The temperature sensor 122a is arranged close to the CPU 111a. The temperature sensor 122b is arranged close to the charging circuit 124. The temperature sensor 122c is arranged close to the power amplifier 114a. The temperature sensor 122d is arranged close to the battery 123. The temperature sensors 122a to 122d notify the control unit 111 of the measured temperatures.

The battery 123 is a secondary battery capable of performing charging and discharging repeatedly. Electrical energy is accumulated by the charging circuit 124 in the battery 123. The battery 123 supplies the accumulated electrical energy to the components of the mobile terminal apparatus 100. For example, the battery 123 supplies the electrical energy to the CPUs 111a and 111b and the radio interface 114. The charging circuit 124 acquires electrical energy from an external power supply outside the mobile terminal apparatus 100 and charges the battery 123 with the electrical energy. The charging circuit 124 charges the battery 123 when the mobile terminal apparatus 100 is connected to the externa power supply.

Since the user touches the surface of the mobile terminal apparatus 100, it is preferable that the surface temperature of the mobile terminal apparatus 100 is not excessively high. Thus, the mobile terminal apparatus 100 estimates the surface temperature by using the temperature sensors 122a to 122d. When the estimated surface temperature exceeds a threshold, the mobile terminal apparatus 100 lowers the operation level of a component so that the surface temperature drops. Expressions for estimating the surface temperature are generated by a design apparatus and stored in the mobile terminal apparatus 100 in advance.

Figure 3:
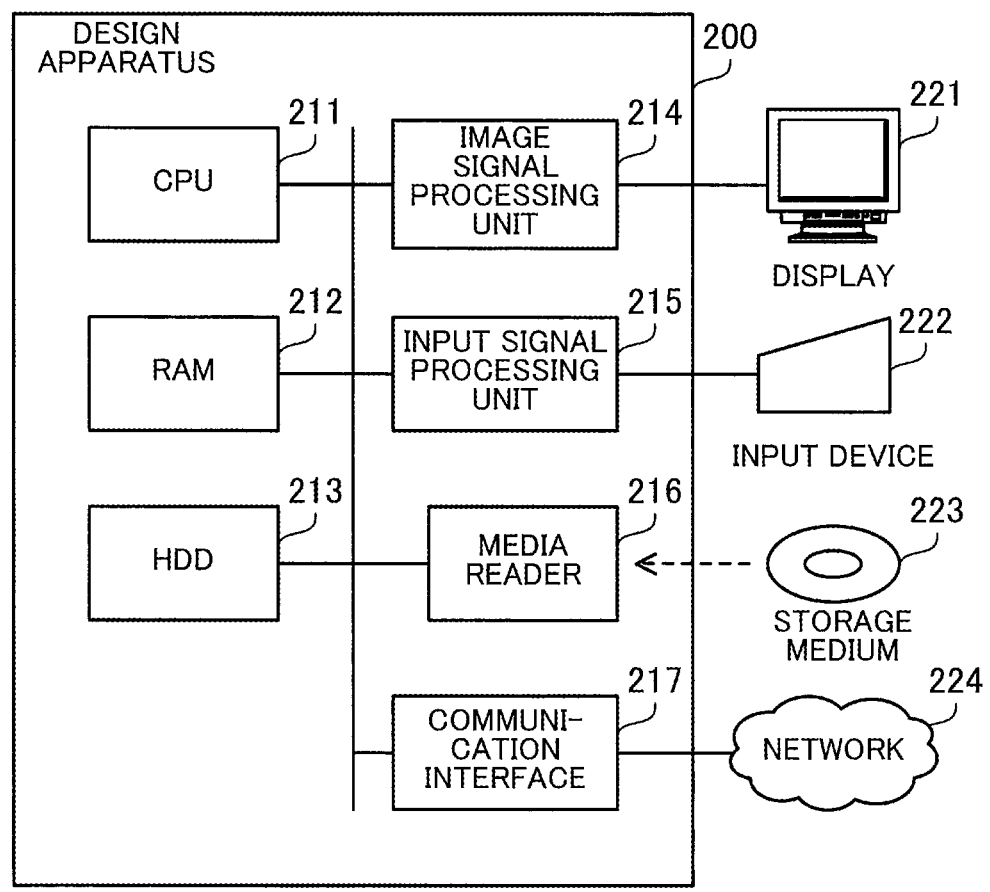
FIG. 3 is a block diagram illustrating a hardware example of a design apparatus.

FIG. 3 is a block diagram illustrating a hardware example of the design apparatus.

This design apparatus 200 according to the second embodiment determines various kinds of parameters used to estimate the surface temperature of the mobile terminal apparatus 100. The parameters generated by the design apparatus 200 are stored in advance in the non-volatile memory 113 of the mobile terminal apparatus 100. Estimation expressions may be transmitted from the design apparatus 200 or another apparatus to the mobile terminal apparatus 100 via a network. The design apparatus 200 may be a client apparatus such as a client computer operated by a user or a server apparatus such as a server computer. The design apparatus 200 includes a CPU 211, a RAM 212, an HDD 213, an image signal processing unit 214, an input signal processing unit 215, a media reader 216, and a communication interface 217.

The CPU 211 is a processor including an arithmetic circuit that executes program commands. The CPU 211 loads at least a part of the programs or data stored in the HDD 213 to the RAM 212 and executes the program. The RAM 212 is a volatile semiconductor memory that temporarily holds a program executed by the CPU 211 or data used for arithmetic processing by the CPU 211. The HDD 213 is a non-volatile storage device that holds data and software programs such as operating system (OS) programs, middleware programs, and application software programs. The design apparatus 200 may include a different kind of storage device such as a flash memory or an SSD.

The image signal processing unit 214 outputs images to a display 221 connected to the design apparatus 200 in accordance with commands from the CPU 211. The input signal processing unit 215 acquires input signals from an input device 222 connected to the design apparatus 200 and outputs the acquired input signals to the CPU 211. Examples of the input device 222 include a pointing device such as a mouse, a touch panel, or a touchpad, a keyboard, a remote controller, and a button switch. A plurality of kinds of input devices may be connected to the design apparatus 200.

The media reader 216 is a reading device that reads programs and data stored in a storage medium 223. Examples of the storage medium 223 include a magnetic disk such as an FD or an HDD, an optical disc such as a CD or a DVD, an MO, and a semiconductor memory. For example, the media reader 216 stores the programs and data read from the storage medium 223 in the RAM 212 or the HDD 213.

The communication interface 217 is connected to a network 224 and communicates with other apparatuses via the network 224. The communication interface 217 may be a wired communication interface connected to communication apparatuses such as switches via cables or may be a radio communication interface connected to base stations via radio links.

Next, heat transfer in the mobile terminal apparatus 100 will be described.

Figure 4:
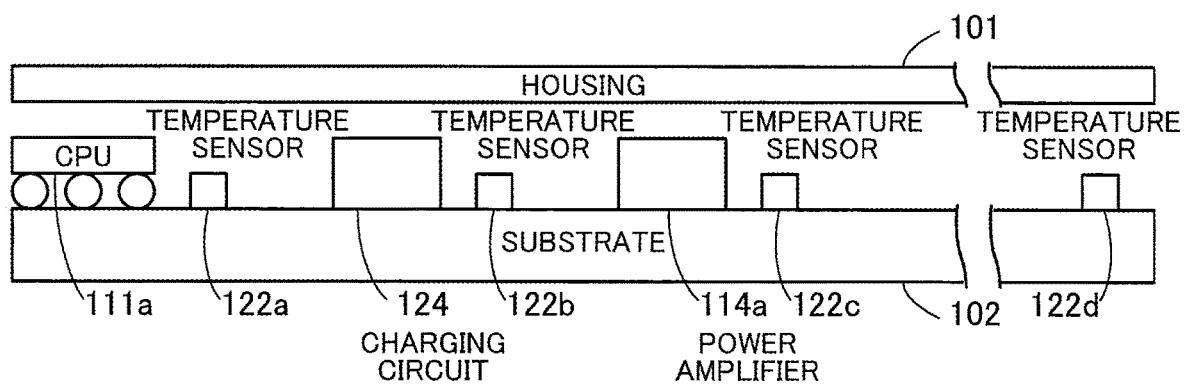
FIG. 4 illustrates an arrangement example of heat sources and temperature sensors.

FIG. 4 illustrates an arrangement example of heat sources and temperature sensors.

The mobile terminal apparatus 100 has a housing 101 and a substrate 102. The housing 101 encloses the components of the mobile terminal apparatus 100. The exterior of the housing 101 could be touched by the user, and the substrate 102 is arranged inside the housing 101. At least some of the components of the mobile terminal apparatus 100 are arranged on the substrate 102. In addition, wirings (for example, copper wirings) electrically connecting two or more components are formed on the substrate 102.

In addition, the CPU 111a, the charging circuit 124, and the power amplifier 114a are arranged on the substrate 102. The CPU 111a, the charging circuit 124, and the power amplifier 114a are components that generate relatively large heat and may be referred to as heat sources. The temperature sensors 122a to 122c are arranged for these heat sources, respectively, on the substrate 102. The temperature sensor 122a is arranged closest to the CPU 111a among the plurality of heat sources. The temperature sensor 122b is arranged closest to the charging circuit 124 among the plurality of heat sources. The temperature sensor 122c is arranged closest to the power amplifier 114a among the plurality of heat sources.

In addition, the mobile terminal apparatus 100 has the temperature sensor 122d that measures a reference temperature. The temperature sensor 122d is arranged farther away from the heat-generating CPU 111a, charging circuit 124, and power amplifier 114a than the temperature sensors 122a to 122c are. It takes time before change of the temperature of a heat source affects the temperature measured by the temperature sensor 122d. As in the first embodiment, this period of time will hereinafter be referred to as "delay time." The delay time of the temperature sensor 122d is longer than that of any of the temperature sensors 122a to 122c. Namely, the thermal time constant of the reference temperature sensor 122d is larger than that of any of the temperature sensors 122a to 122c. The temperature sensor 122d is arranged on the substrate 102.

The heat generated by the CPU 111a is transferred to the temperature sensors 122a to 122d via the substrate 102. However, since the temperature sensor 122a is closest to the CPU 111a, this heat generated by the CPU 111a has the largest impact on the temperature measured by the temperature sensor 122a. Likewise, the heat generated by the charging circuit 124 is transferred to the temperature sensors 122a to 122d via the substrate 102. However, since the temperature sensor 122b is closest to the charging circuit 124, this heat generated by the charging circuit 124 has the largest impact on the temperature measured by the temperature sensor 122b. The heat generated by the power amplifier 114a is transferred to the temperature sensors 122a to 122d via the substrate 102. However, since the temperature sensor 122c is closest to the power amplifier 114a, this heat generated by the power amplifier 114a has the largest impact on the temperature measured by the temperature sensor 122c.

The heat generated by the CPU 111a, the charging circuit 124, and the power amplifier 114a is also transferred to the surface of the housing 101 via the physical materials or space that exists between the substrate 102 and the housing 101. On the surface of the housing 101, the location that exhibits the highest surface temperature depends on a combination of heat amounts generated by the CPU 111a, the charging circuit 124, and the power amplifier 114a. Thus, the location that exhibits the highest surface temperature is not fixed but changes depending on the usage of the individual components.

The CPU 111a, the charging circuit 124, and the power amplifier 114a correspond to the arithmetic processing unit 15, the component 13, and the component 14 according to the first embodiment, respectively. The temperature sensor 122a to 122d correspond to the temperature sensor 18, the temperature sensor 16, the temperature sensor 17, and the reference temperature sensor 19 according to the first embodiment, respectively.

Next, a heat transfer model in which the number of heat sources on the substrate 102 is only one will be described. The following example assumes that the heat amounts generated by the charging circuit 124 and the power amplifier 114a are negligibly small and that only the CPU 111a is the heat source.

In addition, the following example assumes the temperature (reference temperature) measured by the temperature sensor 122d is equal to the outside air temperature.

The heat generated by the heat-generating CPU 111a is transferred to the temperature sensor 122a. Since the heat is gradually transferred from the CPU 111a to the temperature sensor 122a, the measured temperature of the temperature sensor 122a exhibits a transient response as a non-steady state. In addition, the heat generated by the heat-generating CPU 111a is transferred to the surface of the housing 101. Since the heat is gradually transferred from the CPU 111a to the surface of the housing 101, the surface temperature of the housing 101 exhibits a transient response as a non-steady state. Herein, a heat transfer model in which both the transient response from the CPU 111a to the temperature sensor 122a and the transient response from the CPU 111a to the housing 101 are considered will be examined.

A measured temperature $T_{s1}$ of the temperature sensor 122a is defined as indicated by expression (1) in which $T_{s0}$ denotes the measured temperature (reference temperature) of the temperature sensor 122d, $T_{h1}$ denotes the temperature of the CPU 111a, and H(s) denotes frequency-domain transfer function for converting the temperature of the CPU 111a into the measured temperature of the temperature sensor 122a. The above H(s) is a transfer function that takes the transient response into consideration and includes parameters $k_H$ and $\tau_H$. The parameter $k_H$ is a heat transfer coefficient (corresponding to the thermal resistance according to the first embodiment), and $\tau_H$ is a thermal time constant. The values of $k_H$ and $\tau_H$ are calculated in advance by using the design apparatus 200. For example, $k_H$=0.500, and $\tau_H$=40.

$$T_{s1} = T_{s0} = H(s)(T_{h1} - T_{s0}) \qquad (1)$$

$$\text{where } H(s) = \frac{k_H}{1 + s\tau_H}$$

Figure 5:
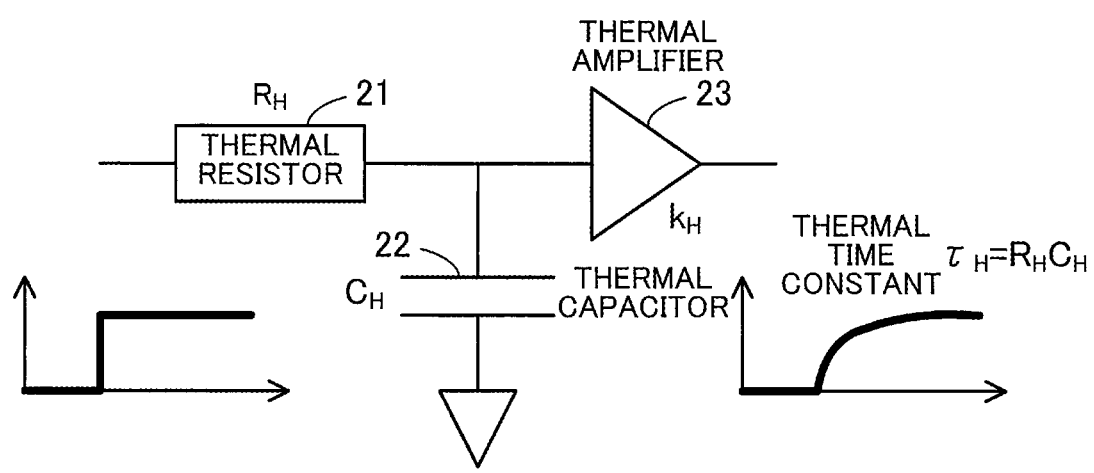
FIG. 5 illustrates an example of a thermal circuit model representing a transient response of heat transfer.

FIG. 5 illustrates an example of a thermal circuit model representing a transient response of heat transfer.

The transfer function H(s) is derived from the thermal circuit model illustrated in FIG. 5. The following description assumes that this thermal circuit model exists between the CPU 111a and the temperature sensor 122a. The thermal circuit model includes a thermal resistor 21, a thermal capacitor 22, and a thermal amplifier 23. The level of the thermal resistor 21 is denoted by $R_H$. The level of the thermal capacitor 22 is denoted by $C_H$. The product of $R_H$ and $C_H$ is denoted by the thermal time constant $\tau_H$. The amplification factor of the thermal amplifier 23 is denoted by $k_H$. The thermal resistor 21 has an input node, which serves as the input node of the thermal circuit model. The thermal resistor 21 has an output node, which is connected to the input node of the thermal capacitor 22 and the input node of the thermal amplifier 23. The thermal capacitor 22 has an output node, which is grounded. The thermal amplifier 23 has an output node, which serves as the output node of the thermal circuit model.

When the value inputted to the thermal resistor rapidly changes from "0" to "1", the value outputted from the thermal amplifier 23 changes from "0" to "$k_H$". However, the output value of the thermal amplifier 23 does not rapidly change but gradually changes from "0" to "$k_H$". The delay time from when the output value of the thermal amplifier 23 starts to change to when the output value sufficiently reaches "$k_H$" corresponds to the thermal time constant $\tau_H$. Thus, the measured temperature of the temperature sensor 122a is proportional to the heat transfer coefficient $k_H$. In addition, while the measured temperature of the temperature sensor 122a changes with change of the heat amount generated by the CPU 111a, the measured temperature changes more quickly when the thermal time constant $\tau_H$ is smaller. In contrast, the measured temperature changes more slowly when the thermal time constant $\tau_H$ is larger.

The heat transfer from the CPU 111a to the housing 101 may be modeled by using a thermal circuit model equivalent to that used for the heat transfer from the CPU 111a to the temperature sensor 122a. However, the parameters such as the heat transfer coefficient and the thermal time constant differ between the former case and the latter case.

A surface temperature $T_{surface}$ of the housing 101 is defined as indicated by expression (2) in which G(s) denotes a frequency-domain transfer function for converting the temperature of the CPU 111a into the surface temperature of the housing 101. This G(s) is a transfer function that takes the transient response into consideration and includes parameters $k_G$ and $\tau_G$. The parameter $k_G$ is a heat transfer coefficient, and the parameter $\tau_G$ is a thermal time constant. The values of $k_G$ and $\tau_G$ are calculated in advance by using the design apparatus 200. For example, $k_G$=0.425, and $\tau_G$=85.

$$T_{surface} = G(s)(T_{h1} - T_{s0}) + T_{s0} \quad (2)$$
$$\text{where } G(s) = \frac{k_G}{1+s\tau_G}$$

The surface temperature $T_{surface}$ of the housing 101 is defined as indicated by expression (3) from expression (1) and expression (2). In addition, a surface temperature $T_{surface}(t)$ of the housing 101 at a specific time is defined as indicated by expression (4) by using inverse Laplace transform.

$$T_{surface} = \frac{G(s)}{H(s)}(T_{s1} - T_{s0}) + T_{s0} = \frac{k_G}{k_H}\frac{1+s\tau_H}{1+s\tau_G}(T_{s1} - T_{s0}) + T_{s0} \quad (3)$$

$$T_{surface}(t) = \mathcal{L}^{-1}\left(\frac{k_G}{k_H}\frac{1+s\tau_H}{1+s\tau_G}(T_{s1} - T_{s0})\right) + T_{s0} \quad (4)$$

When the inverse Laplace transform is expanded to a difference equation, expression (4) is converted to expression (5). The first term on the right side in expression (5) represents subtraction of the reference temperature from the measured temperature of the temperature sensor 122a, and the second term on the right side represents subtraction of the reference temperature time Δt ago from the measured temperature of the temperature sensor 122a time Δt ago. This Δt denotes a measurement cycle, which is about 10 seconds, for example. In expression 5, t−Δt signifies the previous measurement timing.

$$T_{surface}(t) = a_0(T_{s1}(t) - T_{s0}(t)) + a_1(T_{s1}(t-\Delta t) - T_{s0}(t-\Delta t)) - b_1(T_{surface}(t-\Delta t) - T_{s0}(t-\Delta t)) + T_{s0}(t) \quad (5)$$

$$\text{where } a_0 = \frac{k_G}{k_H}\frac{\Delta t + 2\tau_H}{\Delta t + 2\tau_G}$$

$$a_1 = \frac{k_G}{k_H}\frac{\Delta t - 2\tau_H}{\Delta t + 2\tau_G}$$

$$b_1 = \frac{\Delta t - 2\tau_G}{\Delta t + 2\tau_G}$$

The third term on the right side represents subtraction of the reference temperature time Δt ago from the surface temperature of the housing 101 time Δt ago. The first to third terms on the right side include a coefficient $a_0$, a coefficient $a_1$, and a coefficient $b_1$, which are multiplied by the subtraction results, respectively. The coefficients $a_0$, $a_1$, and $b_1$ are defined as indicated by expression (5) by using the above $k_H$, $k_G$, $\tau_H$, and $\tau_G$. In this way, the mobile terminal apparatus 100 estimates the surface temperature of the housing 101 by using the measured temperature of the temperature sensor 122a, the reference temperature, the previously measured temperature of the temperature sensor 122a, the previous reference temperature, and an estimate of the previous surface temperature of the housing 101.

The following description will be made assuming that the above heat transfer model is expanded to a case in which a plurality of heat sources exist.

Figure 6:
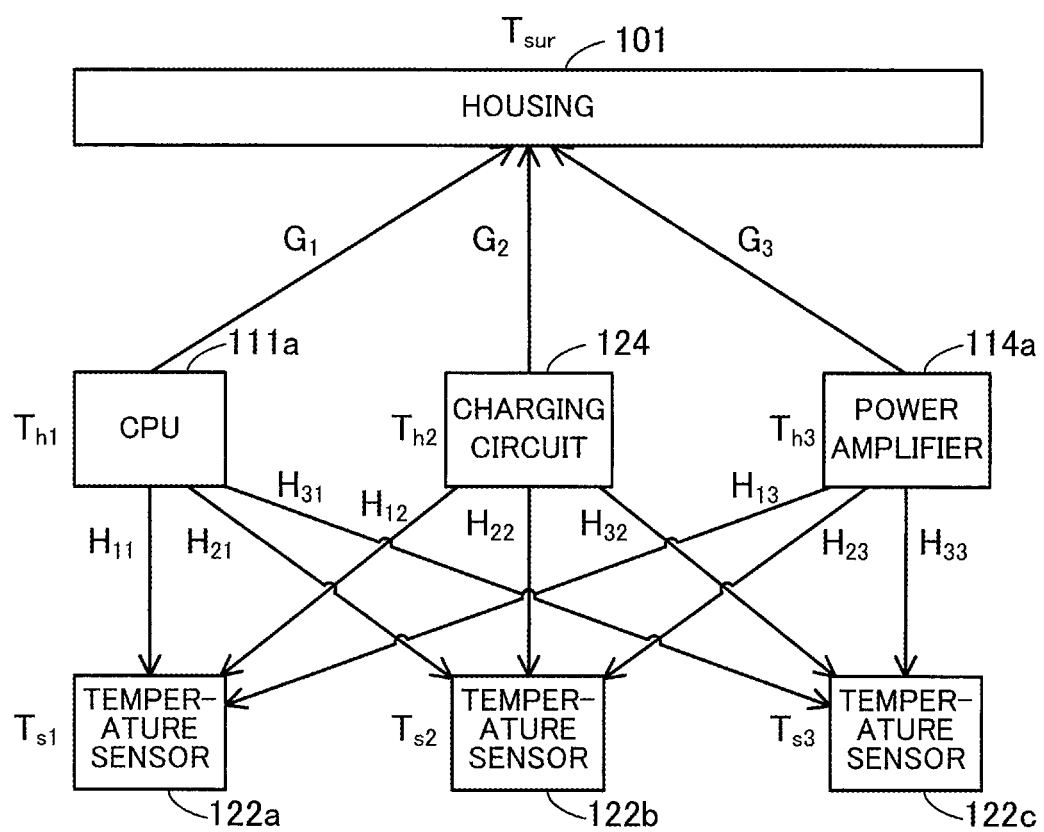
FIG. 6 illustrates an example of heat transfer from the heat sources.

FIG. 6 illustrates an example of heat transfer from a plurality of heat sources.

In FIG. 6, $T_{h1}$ denotes the temperature of the CPU 111a. The heat generated by the CPU 111a is transferred to the temperature sensors 122a, 122b, and 122c via transfer functions $H_{11}(s)$, $H_{21}(S)$, and $H_{31}(s)$, respectively. Likewise, $T_{h2}$ denotes the temperature of the charging circuit 124. The heat generated by the charging circuit 124 is transferred to the temperature sensors 122a, 122b, and 122c via transfer functions $H_{12}(s)$, $H_{22}(s)$, and $H_{32}(s)$, respectively. Likewise, $T_{h3}$ denotes the temperature of the power amplifier 114a. The heat generated by the power amplifier 114a is transferred to the temperature sensors 122a, 122b, and 122c via transfer functions $H_{13}(s)$, $H_{23}(s)$, and $H_{33}(s)$, respectively.

The measured temperature of the temperature sensor 122a is denoted by $T_{s1}$. The measured temperature $T_{s1}$ is obtained by synthesizing the temperatures from the CPU 111a, the charging circuit 124, and the power amplifier 114a. Thus, $T_{s1}$ is defined as illustrated by expression (6) in which $H_{ij}(s)$ denotes a transfer function indicating the heat transfer from the j-th heat source to the i-th temperature sensor, $k_{Hij}$ denotes a heat transfer coefficient from the j-th heat source to the i-th temperature sensor, and $\tau_{Hij}$ denotes a thermal time constant from the j-th heat source to the i-th temperature sensor. The parameters $k_{Hij}$ and $\tau_{Hij}$ are calculated in advance by using the design apparatus 200.

$$T_{s1} - T_{s0} = H_{11}(s)(T_{h1} - T_{s0}) + H_{12}(s)(T_{h2} - T_{s0}) + H_{13}(s)(T_{h3} - T_{s0}) \quad (6)$$

$$\text{where } H_{ij}(s) = \frac{k_{Hij}}{1 + s\tau_{Hij}}$$

Likewise, $T_{s2}$ denotes the measured temperature of the temperature sensor 122b. The measured temperature $T_{s2}$ is obtained by synthesizing the temperatures from the CPU 111a, the charging circuit 124, and the power amplifier 114a. Likewise, $T_{s3}$ denotes the measured temperature of the temperature sensor 122c. The measured temperature $T_{s3}$ is obtained by synthesizing the temperatures from the CPU 111a, the charging circuit 124, and the power amplifier 114a. Thus, $T_{s1}$, $T_{s2}$, and $T_{s3}$ are represented in a matrix form as indicated by expression (7). A matrix H is a matrix of transfer functions. In expression (7), $H_{ij}(s)$ denotes the element in the i-th row and the j-th column of the matrix H and signifies the heat transfer from the j-th heat source to the i-th temperature sensor.

$$\begin{bmatrix} T_{s1} - T_{s0} \\ T_{s2} - T_{s0} \\ T_{s3} - T_{s0} \end{bmatrix} = H \begin{bmatrix} T_{h1} - T_{s0} \\ T_{h2} - T_{s0} \\ T_{h3} - T_{s0} \end{bmatrix} \quad (7)$$

-continued $$= \begin{bmatrix} H_{11}(s) & H_{12}(s) & H_{13}(s) \\ H_{21}(s) & H_{21}(s) & H_{23}(s) \\ H_{31}(s) & H_{32}(s) & H_{33}(s) \end{bmatrix} \begin{bmatrix} T_{h1} - T_{s0} \\ T_{h2} - T_{s0} \\ T_{h3} - T_{s0} \end{bmatrix}$$

In addition, the heat generated by the CPU 111a is transferred to the surface of the housing 101 via a transfer function $G_1(s)$. The heat generated by the charging circuit 124 is transferred to the surface of the housing 101 via a transfer function $G_2(s)$. The heat generated by the power amplifier 114a is transferred to the surface of the housing 101 via a transfer function $G_3(s)$.

In addition, $T_{sur}$ denotes the surface temperature of the housing 101. The surface temperature $T_{sur}$ is obtained by synthesizing the temperatures from the CPU 111a, the charging circuit 124, and the power amplifier 114a. Thus, the surface temperature $T_{sur}$ is defined as indicated by expression (8) in which $G_i(s)$ denotes a transfer function indicating the heat transfer from the i-th heat source to the housing 101, $k_{Gi}$ denotes a heat transfer coefficient from the i-th heat source to the housing 101, and $\tau_{G1i}$ and $\tau_{G2i}$ each denote the thermal time constant of a material that exists between the i-th heat source and the housing 101 (for example, the material of the substrate 102 and the air between the substrate 102 and the housing 101). The parameters $k_{Gi}$, $\tau_{G1i}$, and $\tau_{G2i}$ are calculated in advance by using the design apparatus 200.

$$T_{sur} - T_{s0} = G_1(s)(T_{h1} - T_{s0}) + G_2(s)(T_{h2} - T_{s0}) + G_3(s)(T_{h3} - T_{s0}) \quad (8)$$

$$\text{where } G_i(s) = \frac{k_{Gi}}{(1 + s\tau_{G1i})(1 + s\tau_{G2i})}$$

Expression (8) is represented in a matrix form. When $T_{h1}$, $T_{h2}$, and $T_{h3}$ are expanded by using expression (7), expression (8) is represented as expression (9).

$$T_{sur} - T_{s0} = \begin{bmatrix} G_1(s) \\ G_2(s) \\ G_3(s) \end{bmatrix}^T \begin{bmatrix} T_{h1} - T_{s0} \\ T_{h2} - T_{s0} \\ T_{h3} - T_{s0} \end{bmatrix} = \begin{bmatrix} G_1(s) \\ G_2(s) \\ G_3(s) \end{bmatrix}^T H^{-1} \begin{bmatrix} T_{s1} - T_{s0} \\ T_{s2} - T_{s0} \\ T_{s3} - T_{s0} \end{bmatrix} \quad (9)$$

The inverse matrix of the matrix H is defined as indicated by expression (10). However, in expression (10), a parameter s in an individual transfer function is omitted, and $\Delta$ is an eigenvalue represented by $(H_{11}H_{22}-H_{12}H_{21})H_{33}+(H_{13}H_{21}-H_{11}H_{23})H_{32}+(H_{12}H_{23}-H_{13}H_{22})H_{31}$.

$$H^{-1} = \frac{1}{\Delta} \begin{bmatrix} H_{22}H_{33} - H_{23}H_{32} & H_{13}H_{32} - H_{12}H_{33} & H_{12}H_{23} - H_{13}H_{22} \\ H_{23}H_{31} - H_{21}H_{33} & H_{11}H_{33} - H_{13}H_{31} & H_{13}H_{21} - H_{11}H_{23} \\ H_{21}H_{32} - H_{22}H_{31} & H_{12}H_{31} - H_{11}H_{32} & H_{11}H_{22} - H_{12}H_{21} \end{bmatrix} \quad (10)$$

The transfer function $H_{ij}(s)$ in expression (10) includes the corresponding thermal time constant $\tau_{Hij}$. Thus, a large calculation amount is needed for multiplication of the inverse matrix of the matrix H by the relative temperatures of the temperature sensors 122a to 122c. Namely, an excessive amount of load is placed on the mobile terminal apparatus 100. When the surface temperature $T_{sur}$ is calculated by using expression (9), 6-order filter calculation needs to be performed 9 times. Generally, when the number of combinations of a heat source and a temperature sensor is n (n is an integer of 2 or more), 2n-order filter calculation needs to be performed n² times.

Thus, according to the second embodiment, the mobile terminal apparatus 100 approximately calculates the surface temperature $T_{sur}$ by using a method that needs a small calculation amount. More specifically, when estimating the temperatures of the heat-generating CPU 111a, charging circuit 124, and power amplifier 114a from the measured temperatures of the temperature sensors 122a to 122c, the mobile terminal apparatus 100 uses transfer functions that do not take any transient response on the substrate 102 into consideration. When estimating the surface temperature of the housing 101 from the temperatures of the heat-generating CPU 111a, charging circuit 124, and power amplifier 114a, the mobile terminal apparatus 100 takes the transient response from the substrate 102 to the housing 101 into consideration and uses transfer functions that take the transfer delay on the substrate 102 into consideration. In this approximate calculation, the following heat transfer characteristics are used.

Figure 7:
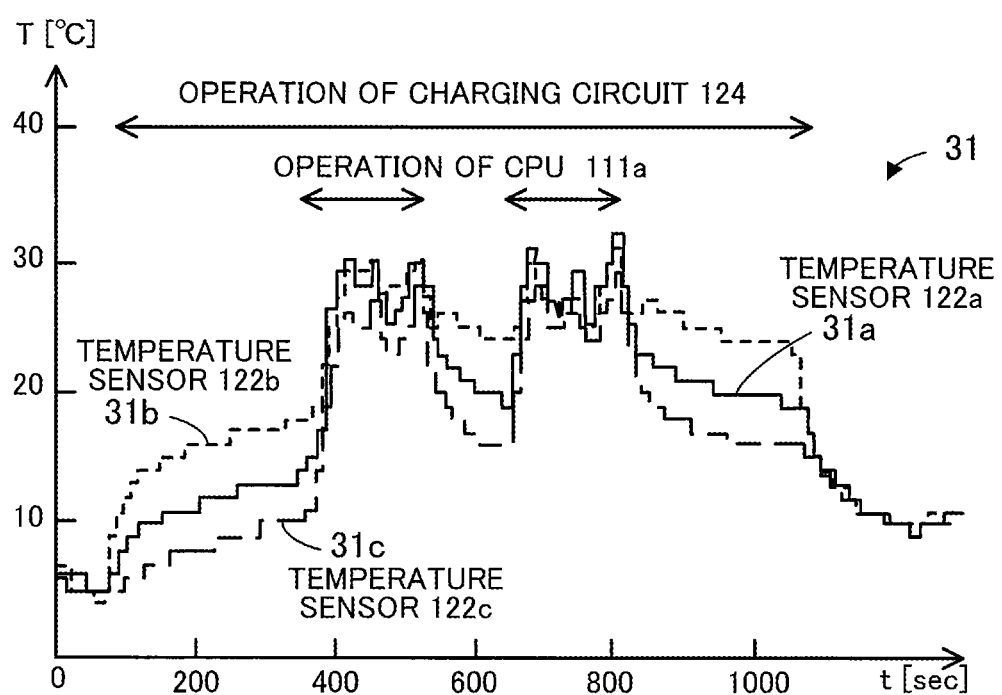
FIG. 7 is a graph illustrating examples of change of the temperatures measured by the temperature sensors.

FIG. 7 is a graph illustrating examples of change of the temperatures measured by the plurality of temperature sensors.

This graph 31 illustrates change of the temperatures (T) measured by the temperature sensors 122a to 122c from the reference temperature. A curve 31a represents change of the measured temperature $T_{s1}$ of the temperature sensor 122a arranged near the CPU 111a. A curve 31b represents change of the measured temperature $T_{s2}$ of the temperature sensor 122b arranged near the charging circuit 124. A curve 31c represents change of the measured temperature $T_{s3}$ of the temperature sensor 122c arranged near the power amplifier 114a.

As illustrated in graph 31, when the charging circuit 124 starts to operate, the measured temperatures $T_{s1}$ to $T_{s3}$ of the temperature sensors 122a to 122c start to rise immediately. In addition, when the charging circuit 124 stops its operation, the measured temperatures $T_{s1}$ to $T_{s3}$ of the temperature sensors 122a to 122c start to drop immediately. Likewise, when the CPU 111a starts to operate, the measured temperatures $T_{s1}$ to $T_{s3}$ of the temperature sensors 122a to 122c start to rise immediately. In addition, when the CPU 111a stops its operation, the measured temperatures $T_{s1}$ to $T_{s3}$ of the temperature sensors 122a to 122c start to drop immediately.

In this way, the measured temperatures $T_{s1}$ to $T_{s3}$ of the temperature sensors 122a to 122c change relatively quickly along with change of the temperature of a heat source. Namely, each of the measured temperatures $T_{s1}$ to $T_{s3}$ of the temperature sensors 122a to 122c has a high response speed and a smaller thermal time constant than that of the surface temperature of the housing 101. In addition, the difference among the response speeds of the temperature sensors 122a to 122c is small. This is because, since material having a small thermal resistance, such as copper wirings, is used for the substrate 102, the heat from the heat sources to the temperature sensors 122a to 122c are quickly transferred.

Thus, the inverse matrix of the matrix H is approximately resolved as indicated by expression (11). This signifies resolving $k_{Hij}$ and $1+s\tau_{Hij}$, which are the numerator and the denominator of the transfer function $H_{ij}(s)$, respectively. The right side in the expression (11) includes an operator called a Hadamard product for obtaining a product per corresponding matrix element, unlike a usual matrix product. The second term on the right side includes the heat transfer coefficient $K_{Hij}$ and is an inverse matrix of a matrix that does not include any thermal time constant. The second term is used to estimate the heat source temperatures. The first term on the right side is a matrix including a single thermal time constant per heat source and is used to estimate the surface temperature from the heat source temperatures.

$$H^{-1} \approx \begin{bmatrix} 1+s\tau_{H1} \\ 1+s\tau_{H2} \\ 1+s\tau_{H3} \end{bmatrix} \circ \begin{bmatrix} k_{H11} & k_{H12} & k_{H13} \\ k_{H21} & k_{H22} & k_{H23} \\ k_{H31} & k_{H32} & k_{H33} \end{bmatrix}^{-1} \quad (11)$$

Estimating the heat source temperatures by using the second term signifies assuming a steady state, instead of taking the transient response as a non-steady state into consideration. In this way, the amount of calculation for estimating the heat source temperatures is significantly reduced. Since the delay of the heat transfer from the heat sources to the temperature sensors 122a to 122c is not considered, the heat source temperatures estimated by using the second term correspond to the heat source temperatures a certain time before the temperature sensors 122a to 122c have measured the respective temperatures. Thus, the first term is incorporated into a transfer function for estimating the surface temperature from the heat source temperatures. This signifies taking an estimated delay of the heat source temperatures into consideration when the surface temperature is estimated.

Expression (11) uses thermal time constants $\tau_{H1}$, $\tau_{H2}$, and $\tau_{H3}$ corresponding to the CPU 111a, the charging circuit 124, and the power amplifier 114a, respectively. However, since the thermal time constant on the substrate 102 is small, the same value may be used as $\tau_{H1}$, $\tau_{H2}$, and $\tau_{H3}$. The parameter $\tau_{Hi}$ is calculated in advance by using the design apparatus 200.

By using the above approximate calculation, the heat source temperatures $T_{h1}$, $T_{h2}$, and $T_{h3}$ are calculated as indicated by expression (12). A matrix K is a matrix of approximate transfer functions on the substrate 102. In the matrix K, $k_{Hij}$ denotes an element in the i-th row and the j-th column and represents the heat transfer that does not take the thermal time constant from the j-th heat source to the i-th temperature sensor into consideration. The matrix K is defined as indicated by expression (13) in which $\Delta$ is an eigenvalue represented by $(k_{H11}k_{H22}-k_{H12}k_{H21})k_{H33}+(k_{H13}k_{H21}-k_{H11}k_{H23})k_{H32}+(k_{H12}k_{H23}-k_{H13}k_{H22})k_{H31}$. Since the transient response is not considered, the calculation amount of the multiplication of the matrix K by $T_{s1}$, $T_{s2}$, and $T_{s3}$ is much smaller than that of the multiplication of the inverse matrix of the matrix H by $T_{s1}$, $T_{s2}$, and $T_{s3}$.

$$\begin{bmatrix} T_{h1}-T_{s0} \\ T_{h2}-T_{s0} \\ T_{h3}-T_{s0} \end{bmatrix} = \begin{bmatrix} 1+s\tau_{H1} \\ 1+s\tau_{H2} \\ 1+s\tau_{H3} \end{bmatrix} \circ \begin{bmatrix} k_{H11} & k_{H12} & k_{H13} \\ k_{H21} & k_{H22} & k_{H23} \\ k_{H31} & k_{H32} & k_{H33} \end{bmatrix}^{-1} \begin{bmatrix} T_{s1}-T_{s0} \\ T_{s2}-T_{s0} \\ T_{s3}-T_{s0} \end{bmatrix}$$

$$= \begin{bmatrix} 1+s\tau_{H1} \\ 1+s\tau_{H2} \\ 1+s\tau_{H3} \end{bmatrix} \circ K \begin{bmatrix} T_{s1}-T_{s0} \\ T_{s2}-T_{s0} \\ T_{s3}-T_{s0} \end{bmatrix} \quad (12)$$

$$K = \frac{1}{\Delta} \begin{bmatrix} k_{H22}k_{H33}-k_{H23}k_{H32} & k_{H13}k_{H32}-k_{H12}k_{H33} & k_{H12}k_{H23}-k_{H13}k_{H22} \\ k_{H23}k_{H31}-k_{H21}k_{H33} & k_{H11}k_{H33}-k_{H13}k_{H31} & k_{H13}k_{H21}-k_{H11}k_{H23} \\ k_{H21}k_{H32}-k_{H22}k_{H31} & k_{H12}k_{H31}-k_{H11}k_{H32} & k_{H11}k_{H22}-k_{H12}k_{H21} \end{bmatrix}$$

$$= \begin{bmatrix} ik_{H11} & ik_{H12} & ik_{H13} \\ ik_{H21} & ik_{H22} & ik_{H23} \\ ik_{H31} & ik_{H32} & ik_{H33} \end{bmatrix} \quad (13)$$

By using the above approximate calculation, the surface temperature $T_{sur}$ of the housing 101 is expressed as expression (14) from expression (9) and expression (12).

$$T_{sur} = \begin{bmatrix} G_1(s) \\ G_2(s) \\ G_3(s) \end{bmatrix}^T \left( \begin{bmatrix} 1+s\tau_{H1} \\ 1+s\tau_{H2} \\ 1+s\tau_{H3} \end{bmatrix} \circ K \begin{bmatrix} T_{s1}-T_{s0} \\ T_{s2}-T_{s0} \\ T_{s3}-T_{s0} \end{bmatrix} \right) + T_{s0} \quad (14)$$

In addition, expression (14) is expanded to expression (15).

$$T_{sur} = \begin{bmatrix} G_1(s) \\ G_2(s) \\ G_3(s) \end{bmatrix}^T \left( \begin{bmatrix} 1+s\tau_{H1} \\ 1+s\tau_{H2} \\ 1+s\tau_{H3} \end{bmatrix} \circ K \begin{bmatrix} T_{s1}-T_{s0} \\ T_{s2}-T_{s0} \\ T_{s3}-T_{s0} \end{bmatrix} \right) + T_{s0} \quad (15)$$

$$= \begin{bmatrix} G_1(s)(1+s\tau_{H1}) \\ G_2(s)(1+s\tau_{H2}) \\ G_3(s)(1+s\tau_{H3}) \end{bmatrix}^T K \begin{bmatrix} T_{s1} \\ T_{s2} \\ T_{s3} \end{bmatrix} - \begin{bmatrix} G_1(s)(1+s\tau_{H1}) \\ G_2(s)(1+s\tau_{H2}) \\ G_3(s)(1+s\tau_{H3}) \end{bmatrix}^T$$

$$K \begin{bmatrix} T_{s0} \\ T_{s0} \\ T_{s0} \end{bmatrix} + T_{s0}$$

where $G_i(s)(1+s\tau_{Hi}) = \dfrac{k_{Gi}(1+s\tau_{Hi})}{(1+s\tau_{G1i})(1+s\tau_{G2i})}$ The thermal time constants from the heat sources to the temperature sensor 122d are larger than those from the heat sources to the temperature sensors 122a to 122c. Thus, the surface temperature $T_{sur}$ is expressed as indicated by expression (16), by using the fact that $G_i(s)(1+s\tau_{Hi})$ equals to $k_{Gi}$ when the time is infinitely great in expression (15) (corresponding to when s→0 based on the Laplace transform final value theorem).

$$T_{sur} = \begin{bmatrix} G_1(s)(1+s\tau_{H1}) \\ G_2(s)(1+s\tau_{H2}) \\ G_3(s)(1+s\tau_{H3}) \end{bmatrix}^T K \begin{bmatrix} T_{s1} \\ T_{s2} \\ T_{s3} \end{bmatrix} - \begin{bmatrix} k_{G1} \\ k_{G2} \\ k_{G3} \end{bmatrix}^T K \begin{bmatrix} T_{s0} \\ T_{s0} \\ T_{s0} \end{bmatrix} + T_{s0} \quad (16)$$

$$= \begin{bmatrix} G_1(s)(1+s\tau_{H1}) \\ G_2(s)(1+s\tau_{H2}) \\ G_3(s)(1+s\tau_{H3}) \end{bmatrix}^T K \begin{bmatrix} T_{s1} \\ T_{s2} \\ T_{s3} \end{bmatrix} - \begin{bmatrix} k_{G1}(ik_{H11}+ik_{H12}+ik_{H13}) \\ k_{G2}(ik_{H21}+ik_{H22}+ik_{H23}) \\ k_{G3}(ik_{H31}+ik_{H32}+ik_{H33}) \end{bmatrix}^T$$

$$\begin{bmatrix} T_{s0} \\ T_{s0} \\ T_{s0} \end{bmatrix} + T_{s0}$$

$$= \begin{bmatrix} G_1(s)(1+s\tau_{H1}) \\ G_2(s)(1+s\tau_{H2}) \\ G_3(s)(1+s\tau_{H3}) \end{bmatrix}^T K \begin{bmatrix} T_{s1} \\ T_{s2} \\ T_{s3} \end{bmatrix} + \left\{ 1 - \sum_{i=1}^{3} k_{Gi}(ik_{Hi1}+ik_{Hi2}+ik_{Hi3}) \right\} T_{s0}$$

-continued $$= \begin{bmatrix} G_1(s)(1+s\tau_{H1}) \\ G_2(s)(1+s\tau_{H2}) \\ G_3(s)(1+s\tau_{H3}) \end{bmatrix}^T K \begin{bmatrix} T_{s1} \\ T_{s2} \\ T_{s3} \end{bmatrix} + \alpha T_{s0}$$

While the above description assumes that the reference temperature $T_{s0}$ is equal to the outside air temperature, depending on the location of the temperature sensor 122d, the reference temperature measured could be affected by the heat generated by a heat source. For example, since a heat source and a reference temperature sensor in a small electronic apparatus needs to be arranged close to each other, the reference temperature measured could be affected by the heat generated by the heat source. In this case, the estimation accuracy of the surface temperature is deteriorated.

Thus, the mobile terminal apparatus 100 according to the second embodiment estimates the outside air temperature as follows.

Hereinafter, how the mobile terminal apparatus 100 estimates the outside air temperature will be described.

The measured temperature (reference temperature) $T_{s0}$ of the temperature sensor 122d and an outside air temperature $T_G$ are expressed as indicated by expression (17). In expression (17), $X_1(s)$ is a transfer function representing the heat transfer from the CPU 111a to the temperature sensor 122d, $X_2(s)$ is a transfer function representing the heat transfer from the charging circuit 124 to the temperature sensor 122d, and $X_3(s)$ is a transfer function representing the heat transfer from the power amplifier 114a to the temperature sensor 122d. In addition, $k_{Xi}$ is a heat transfer coefficient from the i-th heat source to the temperature sensor 122d, and $\tau_{Xi}$ is a thermal time constant from the i-th heat source to the temperature sensor 122d. These parameters $k_{Xi}$ and $\tau_{Xi}$ are calculated in advance by using the design apparatus 200.

$$T_{s0} - T_G = \begin{bmatrix} X_1(s) \\ X_2(s) \\ X_3(s) \end{bmatrix}^T \begin{bmatrix} T_{h1} - T_G \\ T_{h2} - T_G \\ T_{h3} - T_G \end{bmatrix} \quad (17)$$

where $X_i(s) = \dfrac{k_{Xi}}{1+s\tau_{Xi}}$

The reference temperature $T_{s0}$ is expressed as indicated by expression (18), by using the above inverse matrix of the matrix H.

$$T_{s0} = \begin{bmatrix} X_1(s) \\ X_2(s) \\ X_3(s) \end{bmatrix}^T H^{-1} \begin{bmatrix} T_{s1} - T_G \\ T_{s2} - T_G \\ T_{s3} - T_G \end{bmatrix} + T_G \quad (18)$$

Since the inverse matrix of the matrix H in expression (18) is approximated as indicated by the above expression (11), expression (18) is converted to the expressions equivalent to expression (12) to expression (16) and expressed as expression (19).

$$T_{s0} = \begin{bmatrix} X_1(s)(1+s\tau_{H1}) \\ X_2(s)(1+s\tau_{H2}) \\ X_3(s)(1+s\tau_{H3}) \end{bmatrix}^T K \begin{bmatrix} T_{s1} \\ T_{s2} \\ T_{s3} \end{bmatrix} - \begin{bmatrix} k_{X1} \\ k_{X2} \\ k_{X3} \end{bmatrix}^T K \begin{bmatrix} T_G \\ T_G \\ T_G \end{bmatrix} + T_G \quad (19)$$

$$= \begin{bmatrix} X_1(s)(1+s\tau_{H1}) \\ X_2(s)(1+s\tau_{H2}) \\ X_3(s)(1+s\tau_{H3}) \end{bmatrix}^T K \begin{bmatrix} T_{s1} \\ T_{s2} \\ T_{s3} \end{bmatrix} - \begin{bmatrix} k_{X1}(ik_{H11}+ik_{H12}+ik_{H13}) \\ k_{X2}(ik_{H21}+ik_{H22}+ik_{H23}) \\ k_{X3}(ik_{H31}+ik_{H32}+ik_{H33}) \end{bmatrix}^T$$

$$\begin{bmatrix} T_G \\ T_G \\ T_G \end{bmatrix} + T_G$$

Since the reference temperature $T_{s0}$ is the temperature measured by the temperature sensor 122d, the outside air temperature $T_G$ is calculated by expression (20).

$$T_G = \dfrac{\left\{ T_{s0} - \begin{bmatrix} X_1(s)(1+s\tau_{H1}) \\ X_2(s)(1+s\tau_{H2}) \\ X_3(s)(1+s\tau_{H3}) \end{bmatrix}^T K \begin{bmatrix} T_{s1} \\ T_{s2} \\ T_{s3} \end{bmatrix} \right\}}{\beta} \quad (20)$$

where $\beta = 1 - \sum\limits_{i=1}^{3} k_{Xi}(ik_{Hi1}+ik_{Hi2}+ik_{Hi3})$

Thus, by using the calculated outside air temperature $T_G$, instead of the reference temperature $T_{s0}$, in expression (16), $T_{sur}$ is calculated as indicated by expression (21).

$$T_{sur} = \begin{bmatrix} G_1(s)(1+s\tau_{H1}) \\ G_2(s)(1+s\tau_{H2}) \\ G_3(s)(1+s\tau_{H3}) \end{bmatrix}^T K \begin{bmatrix} T_{s1} \\ T_{s2} \\ T_{s3} \end{bmatrix} + \alpha T_G \quad (21)$$

Next, an example of how the design apparatus 200 determines parameters for the transfer functions $X_i(s)$, $H_{ij}(s)$, and $G_i(s)$ will be described.

By using the actual mobile terminal apparatus 100 or a sample thereof, the design apparatus 200 acquires the temperatures measured by the temperature sensors 122a to 122c and the surface temperature of the housing 101 and the outside air temperature measured by a thermocouple or the like when an individual heat source is operated alone.

Figure 8:
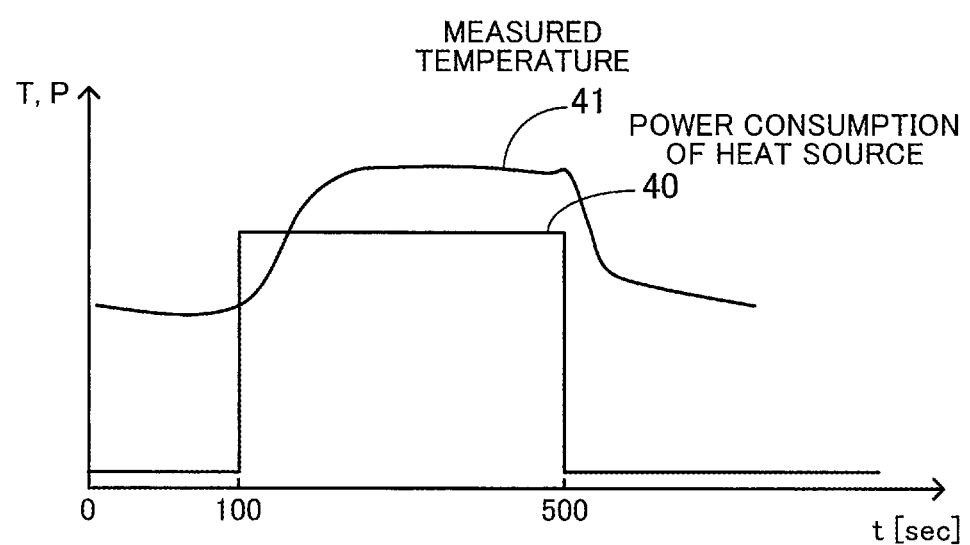
FIG. 8 illustrates an example of a measured temperature when a heat source is operated.

FIG. 8 illustrates an example of a measured temperature when a heat source is operated. The vertical axis represents power consumption P and temperature T, and the horizontal axis represents time t (sec.).

A waveform 40 represents the power consumption of the heat source, and a waveform 41 represents the temperature measured by the temperature sensor (one of the temperature sensors 122a to 122c) arranged for the heat source.

In the example in FIG. 8, a certain heat source performs a step motion when t=100 to 500 [sec]. When the heat source starts to operate, the measured temperature of the temperature sensor arranged for the certain heat source rises. The design apparatus 200 acquires the temperature measured while the heat source is in operation, for example, in a steady state.

When the CPU 111a is operated alone, for example, the CPU 111a is controlled to start benchmark software. When the power amplifier 114a is operated alone, for example, the power amplifier 114a is controlled to change a radio input signal from its minimum value to its maximum value. When the charging circuit 124 is operated alone, for example, the charging circuit 124 is controlled to start quick charging.

A surface temperature $T_{sur1}$ of the housing 101 when the CPU 111a is operated alone is expressed as indicated by expression (22). A surface temperature $T_{sur2}$ of the housing 101 when the power amplifier 114a is operated alone is expressed as indicated by expression (23). A surface temperature $T_{sur3}$ of the housing 101 when the charging circuit 124 is operated alone is expressed as indicated by expression (24).

$$T_{sur1} = \frac{G_1(s)}{H_{11}(s)}(T_{s1} - T_G) + T_G \qquad (22)$$

where $$\frac{G_1(s)}{H_{11}(s)} = \frac{k_{G1}}{(1+s\tau_{G11})(1+s\tau_{G21})} \frac{1+s\tau_{H11}}{k_{H11}}$$
$$= \frac{k_{G1}(1+s\tau_{H1})}{(1+s\tau_{G11})(1+s\tau_{G21})}$$

$$T_{sur2} = \frac{G_2(s)}{H_{11}(s)}(T_{s2} - T_G) + T_G \qquad (23)$$

where $$\frac{G_2(s)}{H_{22}(s)} = \frac{k_{G2}}{(1+s\tau_{G12})(1+s\tau_{G22})} \frac{1+s\tau_{H22}}{k_{H22}}$$
$$= \frac{k_{G2}(1+s\tau_{H2})}{(1+s\tau_{G12})(1+s\tau_{G22})}$$

$$T_{sur3} = \frac{G_3(s)}{H_{33}(s)}(T_{s3} - T_G) + T_G \qquad (24)$$

where $$\frac{G_3(s)}{H_{33}(s)} = \frac{k_{G3}}{(1+s\tau_{G13})(1+s\tau_{G23})} \frac{1+s\tau_{H33}}{k_{H33}}$$
$$= \frac{k_{G3}(1+s\tau_{H3})}{(1+s\tau_{G13})(1+s\tau_{G23})}$$

In expression (22) to expression (24), $k_{H11}=k_{H22}=k_{H33}=1$, $\tau_{H11}=\tau_{H21}=\tau_{H31}=\tau_{H1}$, $\tau_{H12}=\tau_{H22}=\tau_{H32}=\tau_{H2}$, and $\tau_{H13}=\tau_{H23}=\tau_{H33}=\tau_{H3}$.

The design apparatus 200 acquires the temperatures measured by the temperature sensors 122a to 122c and the surface temperature of the housing 101 and the outside air temperature measured by a thermocouple or the like when an individual heat source is operated alone. In addition, based on expression (22) to expression (24), the design apparatus 200 determines $k_{G1}$, $k_{G2}$, $k_{G3}$, $\tau_{G11}$, $\tau_{G21}$, $\tau_{G22}$, $\tau_{G12}$, $\tau_{G23}$, $\tau_{G13}$, $\tau_{H1}$, $\tau_{H2}$, and $\tau_{H3}$.

For example, assuming that a measured value of the surface temperature of the housing 101 is denoted by $T_{sur.mes}$ when the CPU 111a is operated alone, the design apparatus 200 determines $k_{G1}$, $\tau_{G11}$, $\tau_{G21}$, and $\tau_{H1}$ so that a square error E of $T_{sur.mes}$ and $T_{sur1}$ in expression (25) represents a minimum value.

$$E = \Sigma(T_{sur.mes} - T_{sur1})^2 \qquad (25)$$

A reference temperature $T_{s01}$ when the CPU 111a is operated alone is expressed as indicated by expression (26). A reference temperature $T_{s02}$ when the power amplifier 114a is operated alone is expressed as indicated by expression (27). A reference temperature $T_{s03}$ when the charging circuit 124 is operated alone is expressed as indicated by expression (28).

$$T_{s01} = \frac{X_1(s)}{H_{11}(s)}(T_{s1} - T_G) + T_G \qquad (26)$$

where $\dfrac{X_1(s)}{H_{11}(s)} = \dfrac{k_{X1}(1+s\tau_{H1})}{1+s\tau_{X1}}$ $$T_{s02} = \frac{X_2(s)}{H_{22}(s)}(T_{s2} - T_G) + T_G \qquad (27)$$

where $\dfrac{X_2(s)}{H_{22}(s)} = \dfrac{k_{X2}(1+s\tau_{H2})}{1+s\tau_{X2}}$ $$T_{s03} = \frac{X_3(s)}{H_{33}(s)}(T_{s3} - T_G) + T_G \qquad (28)$$

where $\dfrac{X_3(s)}{H_{33}(s)} = \dfrac{k_{X3}(1+s\tau_{H3})}{1+s\tau_{X3}}$

The design apparatus 200 acquires the temperatures measured by the temperature sensors 122a to 122d and the outside air temperature measured by a thermocouple or the like when an individual heat source is operated alone. In addition, based on the expression (26) to expression (28), the design apparatus 200 determines $k_{X1}$, $k_{X2}$, $k_{X3}$, $\tau_{X1}$, $\tau_{X2}$, $\tau_{x3}$, $\tau_{H1}$, $\tau_{H2}$ and $\tau_{H3}$.

For example, the design apparatus 200 determines $k_{X1}$, $\tau_{X1}$, and $\tau_{H1}$ so that a square error of the measured temperature (reference temperature) of the temperature sensor 122d and $T_{s01}$ when the CPU 111a is operated alone represents a minimum value.

When $\tau_{H1}$, $\tau_{H2}$, and $\tau_{H3}$ have already been determined based on expression (22) to expression (24), these values may be used.

The parameters included in the matrix K in expression (13) may be calculated as follows from $T_{s1}$, $T_{s2}$, $T_{s3}$, and $T_G$ obtained when the temperature rise by the heat sources has converged.

Based on $T_{s1}$, $T_{s2}$, $T_{s3}$, and $T_G$ obtained when the CPU 111a is operated alone, $k_{H21}$ is calculated by $(T_{s2}-T_G)/(T_{s1}-T_G)$, and $k_{H31}$ is calculated by $(T_{s3}-T_G)/(T_{s1}-T_G)$.

Based on $T_{s1}$, $T_{s2}$, $T_{s3}$, and $T_G$ obtained when the power amplifier 114a is operated alone, $k_{H12}$ is calculated by $(T_{s1}-T_G)/(T_{s2}-T_G)$, and $k_{H32}$ is calculated by $(T_{s3}-T_G)/(T_{s2}-T_G)$.

Based on $T_{s1}$, $T_{s2}$, $T_{s3}$, and $T_G$ obtained when the charging circuit 124 is operated alone, $k_{H13}$ is calculated by $(T_{s1}-T_G)/(T_{s3}-T_G)$, and $k_{H23}$ is calculated by $(T_{s2}-T_G)/(T_{s3}-T_G)$.

The parameters calculated by the design apparatus 200 as described above are stored in the mobile terminal apparatus 100.

When calculating a difference equation to be described below, the mobile terminal apparatus 100 uses delay data indicating how much an individual heat source has contributed to $T_{s0}$ at the previous sampling time. However, no such delay data exists when the mobile terminal apparatus 100 returns from its sleep state (when the mobile terminal apparatus 100 is restarted or started for the first time). Thus, an initial value of the outside air temperature $T_G$ is not determined.

Since the thermal time constant $T_{xi}$ is relatively large, some of the heat generated by the individual heat sources could still be present when the mobile terminal apparatus 100 is restarted. In this case, $T_{s0}$ could be higher than the outside air temperature $T_G$. In view of this case, it is desirable that an initial value of the outside air temperature $T_G$ when the mobile terminal apparatus 100 is restarted be appropriately defined so that the convergence speed of the calculation for estimating the outside air temperature $T_G$ is not delayed.

Hereinafter, four examples of the method for setting the initial value will be described.

Figure 9:
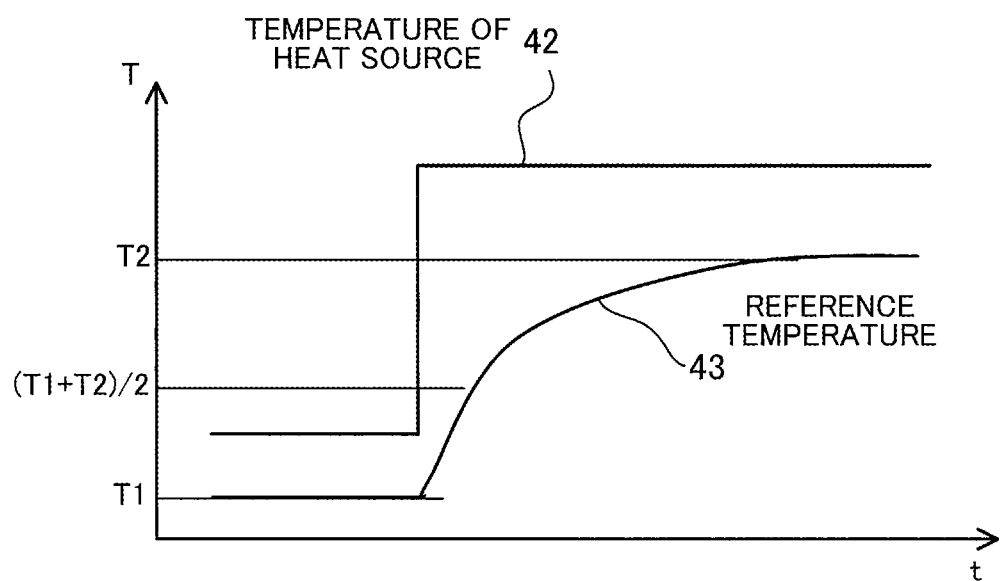
FIG. 9 illustrates an example of a relationship between the temperature of a heat source and a reference temperature.

FIG. 9 illustrates an example of a relationship between the temperature of a heat source and the reference temperature. The vertical axis represents temperature T, and the horizontal axis represents time t.

A waveform 42 represents the temperature of a heat source, and a waveform 43 represents the reference temperature measured by the temperature sensor 122d. The waveform 43 represents the reference temperature that changes by the contributions from the individual heat sources, for example, from the heat-generating CPU 111a, power amplifier 114a, and charging circuit 124 simultaneously operated.

In the first method for setting the initial value, the mobile terminal apparatus 100 assumes that sufficient cooling has been achieved when the mobile terminal apparatus 100 is restarted and that the outside air temperature $T_G$ is equal to $T_{s0}$. Namely, the first method assumes a temperature T1 in FIG. 9 as the initial value of the outside air temperature $T_G$.

In this case, the above expression (19) is converted into expression (29).

$$T_{s0} = \begin{bmatrix} X_1(s)(1+s\tau_{H1}) \\ X_2(s)(1+s\tau_{H2}) \\ X_3(s)(1+s\tau_{H3}) \end{bmatrix}^T K \begin{bmatrix} T_{s1} \\ T_{s2} \\ T_{s3} \end{bmatrix} - \begin{bmatrix} k_{X1} \\ k_{X2} \\ k_{X3} \end{bmatrix}^T K \begin{bmatrix} T_G \\ T_G \\ T_G \end{bmatrix} + T_G \quad (29)$$

$$= \begin{bmatrix} X_1(s)(1+s\tau_{H1}) \\ X_2(s)(1+s\tau_{H2}) \\ X_3(s)(1+s\tau_{H3}) \end{bmatrix}^T K \begin{bmatrix} T_{s1} \\ T_{s2} \\ T_{s3} \end{bmatrix} - \begin{bmatrix} k_{X1} \\ k_{X2} \\ k_{X3} \end{bmatrix}^T K \begin{bmatrix} T_{s0} \\ T_{s0} \\ T_{s0} \end{bmatrix} + T_{s0}$$

The first term on the right side in expression (29) is a time varying term. The initial value of the time varying term is expressed as indicated by expression (30) from expression (13) and expression (29). While the initial value is expressed as column vectors in expression (30), the initial value is defined as a sum of individual elements of column vectors in terms of matrix calculation. The same holds true for the following.

$$\begin{bmatrix} X_1(s)(1+s\tau_{H1}) \\ X_2(s)(1+s\tau_{H2}) \\ X_3(s)(1+s\tau_{H3}) \end{bmatrix}^T K \begin{bmatrix} T_{s1} \\ T_{s2} \\ T_{s3} \end{bmatrix} = \quad (30)$$

$$\begin{bmatrix} k_{X1} \\ k_{X2} \\ k_{X3} \end{bmatrix}^T K \begin{bmatrix} T_{s0} \\ T_{s0} \\ T_{s0} \end{bmatrix} = \begin{bmatrix} k_{X1}(ik_{H11}+ik_{H12}+ik_{H13})T_{s0} \\ k_{X2}(ik_{H21}+ik_{H22}+ik_{H23})T_{s0} \\ k_{X3}(ik_{H31}+ik_{H32}+ik_{H33})T_{s0} \end{bmatrix}$$

By using the initial value of the time varying term, the initial value of the outside air temperature $T_G$ is calculated from expression (20).

In the second method for setting the initial value, the mobile terminal apparatus 100 assumes that the reference temperature $T_{s0}$ has increased up to a saturation temperature (a temperature T2 in FIG. 9) before the mobile terminal apparatus 100 is switched to its sleep state and that sufficient cooling has not been achieved when the mobile terminal apparatus 100 is restarted.

In this case, a value obtained when the time of the time varying term, which corresponds to the first term on the right side in expression (19), is set to an infinite value is expressed as indicated by expression (31) (the value corresponding to when s→0 based on the Laplace transform final value theorem).

$$\lim_{s \to 0} \begin{bmatrix} X_1(s)(1+s\tau_{H1}) \\ X_2(s)(1+s\tau_{H2}) \\ X_3(s)(1+s\tau_{H3}) \end{bmatrix}^T K \begin{bmatrix} T_{s1} \\ T_{s2} \\ T_{s3} \end{bmatrix} = \quad (31)$$

$$\begin{bmatrix} k_{X1} \\ k_{X2} \\ k_{X3} \end{bmatrix}^T K \begin{bmatrix} T_{s1} \\ T_{s2} \\ T_{s3} \end{bmatrix} = \begin{bmatrix} k_{X1}(ik_{H11}+ik_{H12}+ik_{H13})T_{s1} \\ k_{X2}(ik_{H21}+ik_{H22}+ik_{H23})T_{s2} \\ k_{X3}(ik_{H31}+ik_{H32}+ik_{H33})T_{s3} \end{bmatrix}$$

By using the initial value of the time varying term, the initial value of the outside air temperature $T_G$ is calculated from expression (20).

In the third method for setting the initial value, the mobile terminal apparatus 100 assumes that an intermediate value between the two initial values obtained in the above two methods (in the example in FIG. 9, (T1+T2)/2) is the initial value of the outside air temperature $T_G$. This method reduces the risk of slowing down the convergence speed of the calculation for estimating the outside air temperature $T_G$ when the above assumptions are not established in the above two methods.

In the third method, the initial value of the time varying term, which corresponds to the first term on the right side in expression (19), is calculated as indicated by expression (32).

$$\left( \begin{bmatrix} k_{X1}(ik_{H11}+ik_{H12}+ik_{H13})T_{s1} \\ k_{X2}(ik_{H21}+ik_{H22}+ik_{H23})T_{s2} \\ k_{X3}(ik_{H31}+ik_{H32}+ik_{H33})T_{s3} \end{bmatrix} + \quad (32) \right.$$

$$\left. \begin{bmatrix} k_{X1}(ik_{H11}+ik_{H12}+ik_{H13})T_{s0} \\ k_{X2}(ik_{H21}+ik_{H22}+ik_{H23})T_{s0} \\ k_{X3}(ik_{H31}+ik_{H32}+ik_{H33})T_{s0} \end{bmatrix} \right) / 2 =$$

$$\begin{bmatrix} k_{X1}(ik_{H11}+ik_{H12}+ik_{H13})(T_{s1}+T_{s0})/2 \\ k_{X2}(ik_{H21}+ik_{H22}+ik_{H23})(T_{s2}+T_{s0})/2 \\ k_{X3}(ik_{H31}+ik_{H32}+ik_{H33})(T_{s3}+T_{s0})/2 \end{bmatrix}$$

In the fourth method for setting the initial value, the mobile terminal apparatus 100 acquires a temperature measured by an external sensor such as a thermometer having a communication function as the initial value of the outside air temperature $T_G$. Hereinafter, this acquired temperature will be referred to as an external reference temperature.

Figure 10:
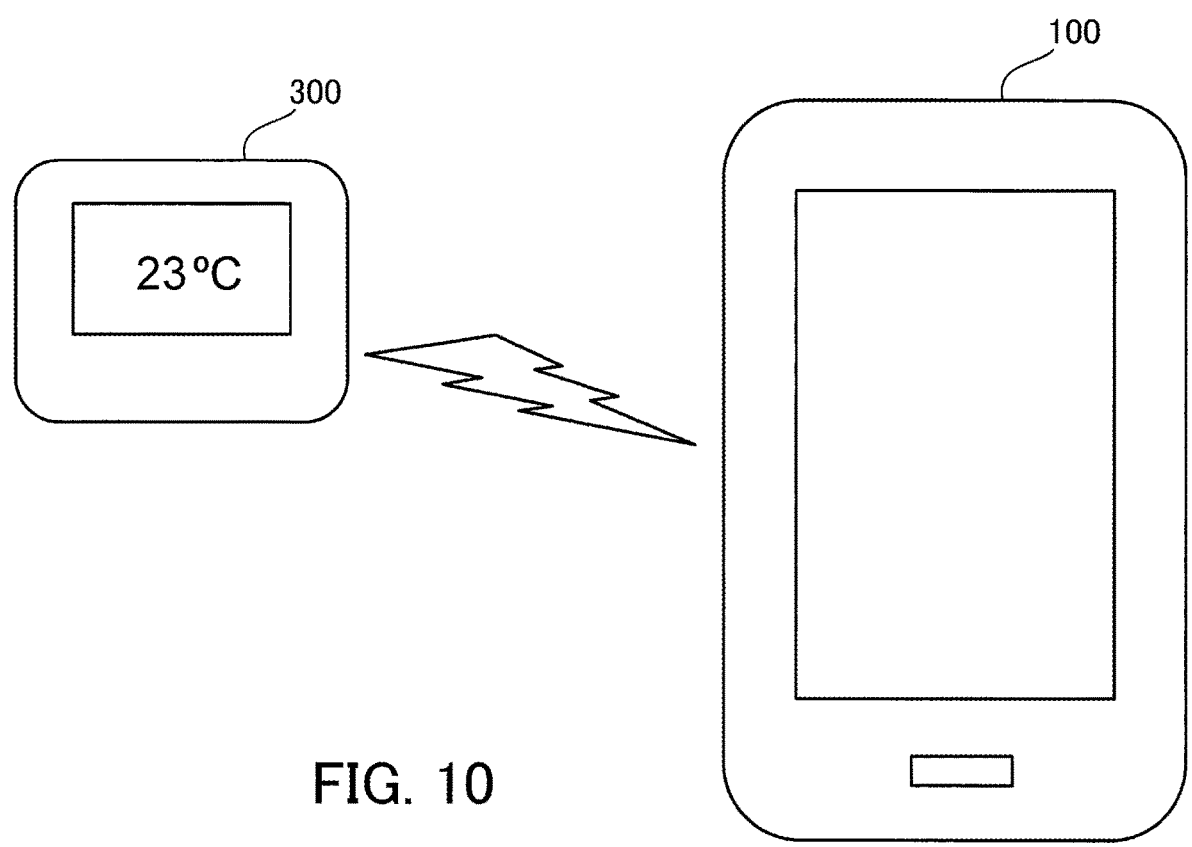
FIG. 10 illustrates the mobile terminal apparatus acquiring an external reference temperature.

FIG. 10 illustrates the mobile terminal apparatus acquiring an external reference temperature.

When restarted, the mobile terminal apparatus 100 uses a near-field communication function to acquires an external reference temperature $T_{Gini}$ measured by an external sensor 300 as the initial value of the outside air temperature $T_G$.

In the fourth method, the mobile terminal apparatus 100 calculates the initial value of the time varying term, which corresponds to the first term on the right side in expression (19), as indicated by expression (33).

$$\begin{bmatrix} X_1(s)(1+s\tau_{H1}) \\ X_2(s)(1+s\tau_{H2}) \\ X_3(s)(1+s\tau_{H3}) \end{bmatrix}^T K \begin{bmatrix} T_{s1} \\ T_{s2} \\ T_{s3} \end{bmatrix} = \begin{bmatrix} k_{X1}(ik_{H11}+ik_{H12}+ik_{H13})T_{Gini} \\ k_{X2}(ik_{H21}+ik_{H22}+ik_{H23})T_{Gini} \\ k_{X3}(ik_{H31}+ik_{H32}+ik_{H33})T_{Gini} \end{bmatrix} \quad (33)$$

In the fourth method for setting the initial value, the mobile terminal apparatus 100 is able to use an accurate outside air temperature actually measured by the external sensor 300 as the initial value.

The mobile terminal apparatus 100 may acquire time-series data of the outside air temperature from the external sensor 300 regularly (with a period longer than that of the estimation of the surface temperature, to reduce the load) and correct the outside air temperature $T_G$ estimated in any of the above methods.

Next, how the mobile terminal apparatus 100 estimates the surface temperature will be described.

The mobile terminal apparatus 100 acquires the measured temperatures of the temperature sensors 122a to 122d and the parameters included in expression (20). Next, the mobile terminal apparatus 100 estimates the outside air temperature $T_G$ in accordance with expression (20).

The outside air temperature $T_G$ at a certain time is calculated by performing inverse Laplace transform on the right side in expression (20). The time varying term of the outside air temperature $T_G$ is expressed as indicated by expression (34). While the time varying term is expressed as column vectors in expression (34), the time varying term is defined as a sum of individual elements of column vectors in terms of matrix calculation.

$$\begin{bmatrix} y_1(s) \\ y_2(s) \\ y_3(s) \end{bmatrix} = \begin{bmatrix} X_1(s)(1+s\tau_{H1}) \\ X_2(s)(1+s\tau_{H2}) \\ X_3(s)(1+s\tau_{H3}) \end{bmatrix} \circ \left( K \begin{bmatrix} T_{s1} \\ T_{s2} \\ T_{s3} \end{bmatrix} \right) \quad (34)$$

$$= \begin{bmatrix} X_1(s)(1+s\tau_{H1}) \\ X_2(s)(1+s\tau_{H2}) \\ X_3(s)(1+s\tau_{H3}) \end{bmatrix} \circ \begin{bmatrix} x_1 \\ x_2 \\ x_3 \end{bmatrix}$$

$$= \begin{bmatrix} X_1(s)(1+s\tau_{H1})x_1 \\ X_2(s)(1+s\tau_{H2})x_2 \\ X_3(s)(1+s\tau_{H3})x_3 \end{bmatrix}$$

The inverse Laplace transform of the time varying term of the outside air temperature $T_G$ is expanded to a time-domain calculation as indicated by expression (35) by using a difference equation.

$$y_i(t) = a_{0i}x_i(t) + a_{1i}x_i(t-\Delta t) - b_{1i}y_i(t-\Delta t) \quad (35)$$

$$\text{where } a_{0i} = \frac{k_{Xi}(2\tau_{Hi}+\Delta t)}{b_{0i}}$$

$$a_{1i} = \frac{-k_{Xi}(2\tau_{Hi}+\Delta t)}{b_{0i}}$$

$$b_{1i} = \frac{-k_{Xi}(2\tau_{Hi}+\Delta t)}{b_{0i}}$$

$$b_{0i} = 2\tau_{Xi} + \Delta t$$

In expression (35), $x_i(t-\Delta t)$ and $y_i(t-\Delta t)$ are delay data, which are values of $x_i$ and $y_i$ time $\Delta t$ ago. Since used in expression (35), the delay data and $a_{0i}$, $a_{1i}$, $b_{1i}$, and $b_{0i}$ are stored in the mobile terminal apparatus 100. The values $a_{0i}$, $a_{1i}$, $b_{1i}$, and $b_{0i}$ are calculated by the design apparatus 200 and stored in the mobile terminal apparatus 100 in advance. From expression (35), the time varying term is $y_1(t)+y_2(t)+y_3(t)$, and from expression (20), the outside air temperature $T_G$ is $(T_{s0}-(y_1(t)+y_2(t)+y_3(t)))/\beta$.

Next, the mobile terminal apparatus 100 uses the estimated outside air temperature $T_G$ to estimate the surface temperature $T_{sur}$ in accordance with expression (21). The surface temperature $T_{sur}$ at a certain time is calculated by performing inverse Laplace transform on the right side in expression (21). The time varying term of the surface temperature $T_{sur}$ is expressed as indicated by expression (36). While the time varying term is expressed as column vectors in expression (36), the time varying term is defined as a sum of individual elements of column vectors in terms of matrix calculation.

$$\begin{bmatrix} y_1^*(s) \\ y_2^*(s) \\ y_3^*(s) \end{bmatrix} = \begin{bmatrix} G_1(s)(1+s\tau_{H1}) \\ G_2(s)(1+s\tau_{H2}) \\ G_3(s)(1+s\tau_{H3}) \end{bmatrix} \circ \left( K \begin{bmatrix} T_{s1} \\ T_{s2} \\ T_{s3} \end{bmatrix} \right) \quad (36)$$

$$= \begin{bmatrix} G_1(s)(1+s\tau_{H1}) \\ G_2(s)(1+s\tau_{H2}) \\ G_3(s)(1+s\tau_{H3}) \end{bmatrix} \circ \begin{bmatrix} x_1 \\ x_2 \\ x_3 \end{bmatrix}$$

$$= \begin{bmatrix} G_1(s)(1+s\tau_{H1})x_1 \\ G_2(s)(1+s\tau_{H2})x_2 \\ G_3(s)(1+s\tau_{H3})x_3 \end{bmatrix}$$

The inverse Laplace transform of the time varying term of the surface temperature $T_{sur}$ is expanded to a time-domain calculation as indicated by expression (37) by using a difference equation.

$$y_i^*(t) = a_{0i}^* x_i(t) + a_{1i}^* x_i(t-\Delta t) + \quad (37)$$
$$a_{2i}^* x_i(t-2\Delta t) - b_{1i}^* y_i^*(t-\Delta t) - b_{2i}^* y_i^*(t-2\Delta t)$$

$$\text{where } a_{0i}^* = \frac{k_{Gi}(2\tau_{Hi}\Delta t + \Delta t^2)}{b_{0i}^*}$$

$$a_{1i}^* = \frac{2k_{Gi}\Delta t^2}{b_{0i}^*}$$

$$a_{2i}^* = \frac{-k_{Gi}(2\tau_{Hi}\Delta t + \Delta t^2)}{b_{0i}^*}$$

$$b_{1i}^* = \frac{(-8\tau_{G1i}\tau_{G2i} + 2\Delta t^2)}{b_{0i}^*}$$

$$b_{2i}^* = \frac{(4\tau_{G1i}\tau_{G2i} - 2\Delta t(\tau_{G1i} + \tau_{G2i}) + \Delta t^2)}{b_{0i}^*}$$

$$b_{0i}^* = 4\tau_{G1i}\tau_{G2i} + 2\Delta t(\tau_{G1i} + \tau_{G2i}) + \Delta t^2$$

In expression (37), $x_i(t-\Delta t)$ and $y^*_i(t-\Delta t)$ are delay data, which are values of $x_i$ and $y^*_i$ time $\Delta t$ ago, and $x_i(t-2\Delta t)$ and $y^*_i(t-2\Delta t)$ are delay data, which are values of $x_i$ and $y^*_i$ time $2\Delta t$ ago. Since used in expression (37), the delay data and $a^*_{0i}$, $a^*_{1i}$, $a^*_{2i}$, $b^*_{1i}$, $b^*_{2i}$, and $b^*_{0i}$ are also stored in the mobile terminal apparatus 100. The values $a^*_{0i}$, $a^*_{1i}$, $a^*_{2i}$, $b^*_{1i}$, $b^*_{2i}$, and $b^*_{0i}$ are calculated by the design apparatus 200 and stored in the mobile terminal apparatus 100 in advance.

Next, the mobile terminal apparatus 100 controls the heat sources on the basis of the estimated surface temperature. When the estimated surface temperature exceeds a threshold, the mobile terminal apparatus 100 controls the operation level of at least one heat source so that the surface temperature will drop. When the mobile terminal apparatus 100 has estimated surface temperatures at two or more locations, the mobile terminal apparatus 100 compares the maximum surface temperature estimated with a threshold. For example, when the estimated surface temperature exceeds a threshold, the mobile terminal apparatus 100 drops the clock frequency of the CPU 111a.

FIG. 11 illustrates an example of a CPU control table.

The CPU control table 44 indicates specifications of the operation levels of the CPU 111a. The mobile terminal apparatus 100 may hold the CPU control table 44 to control the operation levels of the CPU 111a. In the CPU control table 44, limit steps and clock frequencies are associated with each other. Each of the limit steps is an integer indicating the limit of the arithmetic performance of the CPU 111a. In the CPU control table 44, "limit step=0" signifies no limit, and "limit step=5" signifies the maximum limit.

For example, when limit step=0, the CPU 111a operates with a clock frequency of 2.0 GHz. When limit step=1, the CPU 111a operates with a clock frequency of 1.8 GHz. When limit step=2, the CPU 111a operates with a clock frequency of 1.6 GHz. When limit step=3, the CPU 111a operates with a clock frequency of 1.4 GHz. When limit step=4, the CPU 111a operates with a clock frequency of 1.2 GHz. When limit step=5, the CPU 111a operates with a clock frequency of 1.0 GHz. When the limit step is smaller, the CPU 111a operates with a higher clock frequency. Thus, since the arithmetic performance is higher, the CPU 111a generates more heat. In contrast, when the limit step is larger, the CPU 111a operates with a lower clock frequency. Thus, since the arithmetic performance is lower, the CPU 111a generates less heat.

Likewise, the mobile terminal apparatus 100 may switch ON and OFF of the charging circuit 124 on the basis of the estimated surface temperature. For example, when the estimated surface temperature exceeds a threshold, the mobile terminal apparatus 100 switches the charging circuit 124 to an OFF state to stop the charging operation. The mobile terminal apparatus 100 may control the communication speed of the radio interface 114 on the basis of the estimated surface temperature. For example, when the estimated surface temperature exceeds a threshold, the mobile terminal apparatus 100 drops the communication speed of the radio interface 114.

Next, functions of the mobile terminal apparatus 100 and the design apparatus 200 will be described.

Figure 12:
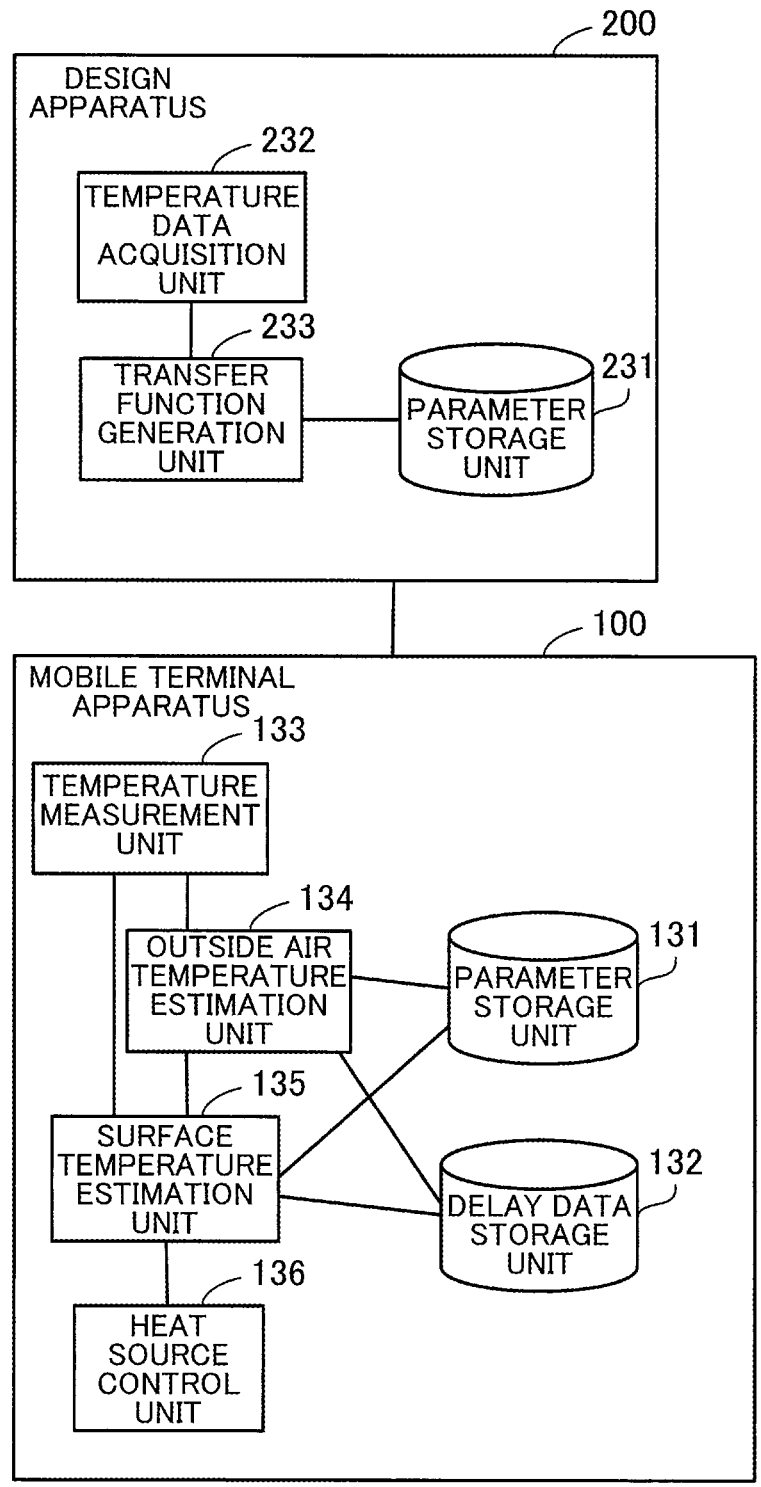
FIG. 12 is a block diagram illustrating examples of functions of the mobile terminal apparatus and the design apparatus.

FIG. 12 is a block diagram illustrating examples of functions of the mobile terminal apparatus and the design apparatus.

The mobile terminal apparatus 100 includes a parameter storage unit 131, a delay data storage unit 132, a temperature measurement unit 133, an outside air temperature estimation unit 134, a surface temperature estimation unit 135, and a heat source control unit 136. The parameter storage unit 131 and the delay data storage unit 132 are implemented by using storage areas ensured in the RAM 112 or the nonvolatile memory 113, for example. The temperature measurement unit 133, the outside air temperature estimation unit 134, the surface temperature estimation unit 135, and the heat source control unit 136 are implemented by using program modules executed by the CPU 111a or the CPU 111b, for example.

The parameter storage unit 131 holds various kinds of parameters such as the heat transfer coefficients and thermal time constants determined by the design apparatus 200 and the coefficients used for calculating the difference equations. The parameters may be stored in the parameter storage unit 131 when the mobile terminal apparatus 100 is manufactured or shipped. The parameters may be stored in the storage medium 120a and distributed to the mobile terminal apparatus 100. Alternatively, the parameters may be distributed from a server apparatus to the mobile terminal apparatus 100 via a radio network. The delay data storage unit 132 holds the delay data included in the above difference equations.

The temperature measurement unit 133 regularly acquires the temperatures measured by the temperature sensors 122a to 122d with a period $\Delta t$ (for example, $\Delta t$=10 seconds).

The outside air temperature estimation unit 134 regularly estimates the outside air temperature with the period $\Delta t$. More specifically, the outside air temperature estimation unit 134 acquires the temperatures measured by the temperature sensors 122a to 122d from the temperature measurement unit 133. The outside air temperature estimation unit 134 calculates the outside air temperature by using the difference equation in expression (35) on the basis of the acquired measured temperatures of the temperature sensors 122a to 122d, the parameters stored in the parameter storage unit 131, and the delay data stored in the delay data storage unit 132. In addition, by using the result of the estimation of the outside air temperature, the outside air temperature estimation unit 134 updates the delay data stored in the delay data storage unit 132. More specifically, the outside air temperature estimation unit 134 changes $y_i(t)$ and $x_i(t)$ to $y_i(t-\Delta t)$ and $x_i(t-\Delta t)$ in expression (35), respectively, and stores the data in the delay data storage unit 132.

The outside air temperature estimation unit 134 determines the initial value of the outside air temperature in accordance with any one of the above four methods.

The surface temperature estimation unit 135 regularly estimates the surface temperature of the housing 101 with the period $\Delta t$. More specifically, the surface temperature estimation unit 135 acquires the temperatures measured by the temperature sensors 122a to 122c from the temperature measurement unit 133. The surface temperature estimation unit 135 calculates the surface temperature of the housing 101 by using the difference equation in expression (37) on the basis of the acquired measured temperatures of the temperature sensors 122a to 122c, the parameters stored in the parameter storage unit 131, and the delay data stored in the delay data storage unit 132. The surface temperature estimation unit 135 may calculate surface temperatures at a plurality of locations by using different parameters. By using the result of the estimation of the surface temperature, the surface temperature estimation unit 135 updates the delay data stored in the delay data storage unit 132. More specifically, the surface temperature estimation unit 135 changes $y^*_i(t)$ and $y^*_i(t-\Delta t)$ to $y^*_i(t-\Delta t)$ and $y^*_i(t-2\Delta t)$ in expression (37), respectively. In addition, the surface temperature estimation unit 135 changes $x^*_i(t)$ and $x^*_i(t-\Delta t)$ to $x^*_i(t-\Delta t)$ and $x^*_i(t-2\Delta t)$ in expression (37), respectively. Next, the surface temperature estimation unit 135 stores the data in the delay data storage unit 132.

The heat source control unit 136 controls heat-generating components of the mobile terminal apparatus 100 on the basis of the surface temperature estimated by the surface temperature estimation unit 135. When the surface temperature estimation unit 135 regularly calculates a plurality of surface temperatures, the heat source control unit 136 selects the maximum surface temperature from the calculated surface temperatures. The heat source control unit 136 compares the single or selected surface temperature acquired from the surface temperature estimation unit 135 with a predetermined threshold. When the surface temperature exceeds the threshold, the heat source control unit 136 limits the operation level of a heat source.

For example, the heat source control unit 136 increments the limit step of the CPU 111a in accordance with the CPU control table 44 illustrated in FIG. 11. In this way, the clock frequency of the CPU 111a drops. Alternatively, for example, the heat source control unit 136 drops the communication speed of the radio interface 114. Alternatively, for example, the heat source control unit 136 stops the charging operation of the charging circuit 124. For example, the CPU 111a gives instructions to the power control unit 121 so that the operation levels of the CPU 111a and the radio interface 114 are controlled.

The design apparatus 200 includes a parameter storage unit 231, a temperature data acquisition unit 232, and a transfer function generation unit 233. The parameter storage unit 231 is implemented by using a storage area ensured in the RAM 212 or the HDD 213, for example. The temperature data acquisition unit 232 and the transfer function generation unit 233 are implemented by using program modules executed by the CPU 211, for example.

The parameter storage unit 231 holds various kinds of parameters such as coefficients used for calculating the difference equations, in addition to the heat transfer coefficients and the thermal time constants determined in any of the above parameter determination methods. The parameters may be stored in the non-volatile memory 113 of the mobile terminal apparatus 100 when the mobile terminal apparatus 100 is manufactured or shipped. The parameters may be stored in the storage medium 120a or distributed via a network.

The temperature data acquisition unit 232 acquires various kinds of temperatures measured by using the actual mobile terminal apparatus 100 or a sample thereof. The measured temperatures may be inputted by a user of the design apparatus 200 to the design apparatus 200. The measured temperatures may directly be acquired from the actual mobile terminal apparatus 100 or a sample thereof connected to the design apparatus 200.

By using various kinds of measured temperatures acquired from the temperature data acquisition unit 232, the transfer function generation unit 233 determines the heat transfer coefficients and the thermal time constants in the transfer functions in accordance with any of the above parameter determination methods and calculates the coefficients in the difference equations. The transfer function generation unit 233 stores the determined and calculated parameters in the parameter storage unit 231. The user of the design apparatus 200 specifies one or more locations whose surface temperature is estimated.

Figure 13:
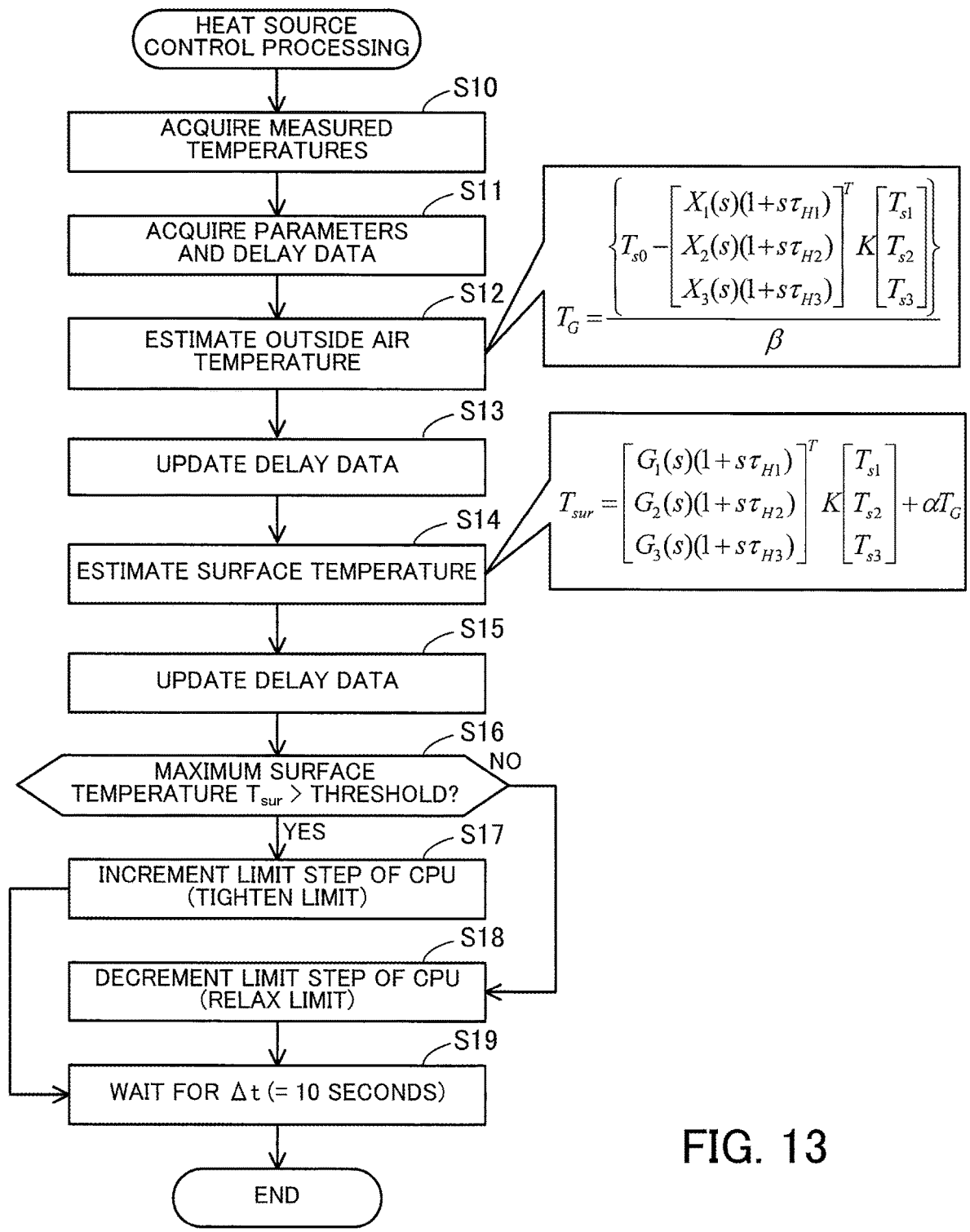
FIG. 13 is a flowchart illustrating an example of a procedure of heat source control processing.

FIG. 13 is a flowchart illustrating an example of a procedure of heat source control processing.

Figure 14:
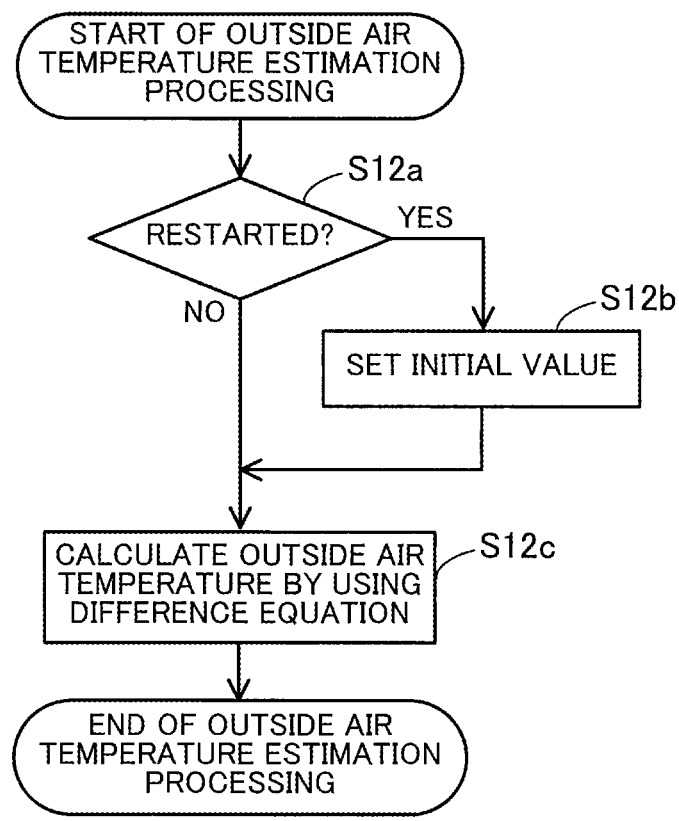
FIG. 14 is a flowchart illustrating an example of a procedure of outside air temperature estimation processing.

In addition, FIG. 14 is a flowchart illustrating an example of a procedure of outside air temperature estimation processing.

(S10) The temperature measurement unit 133 acquires the temperatures (and reference temperature) measured by the temperature sensors 122a to 122d.

(S11) The outside air temperature estimation unit 134 and the surface temperature estimation unit 135 acquire the parameters stored in the parameter storage unit 131 and the delay data stored in the delay data storage unit 132. When the mobile terminal apparatus 100 is restart, there is no delay data used by the outside air temperature estimation unit 134.

(S12) The outside air temperature estimation unit 134 estimates the outside air temperature by using expression (20) and the difference equation in expression (35) on the basis of the acquired measured temperatures (and reference temperature), parameters, and delay data.

The procedure of this outside air temperature estimation processing will be described in detail with reference to FIG. 14.

(S12a) The outside air temperature estimation unit 134 determines whether the mobile terminal apparatus 100 has been restarted. For example, when no delay data is stored in the delay data storage unit 132, the outside air temperature estimation unit 134 determines that the mobile terminal apparatus 100 has been restarted. When the outside air temperature estimation unit 134 determines that the mobile terminal apparatus 100 has been restarted, the processing proceeds to step S12b. Otherwise, the processing proceeds to step S12c.

(S12b) In accordance with any one of the above four methods, the outside air temperature estimation unit 134 sets an initial value corresponding to the delay data, namely, an estimate of how much the individual heat sources contributed to the reference temperature time $\Delta t$ ago. Among the four methods, when the initial value is set by using the external sensor 300 as illustrated in FIG. 10, the outside air temperature estimation unit 134 acquires an external reference temperature measured by the external sensor 300. The outside air temperature estimation unit 134 may acquire the external reference temperature prior to step S10 when the mobile terminal apparatus 100 is restarted.

(S12c) The outside air temperature estimation unit 134 calculates the outside air temperature by using expression (20) and the difference equation in expression (35) on the basis of the acquired measured temperatures (and reference temperature), parameters, and delay data (the set initial value when the mobile terminal apparatus 100 is restarted).

(S13) The outside air temperature estimation unit 134 updates the delay data stored in the delay data storage unit 132 by using the result of the estimation of the outside air temperature.

(S14) The surface temperature estimation unit 135 calculates the surface temperature of the housing 101 at time t by using expression (21) and the difference equation in expression (37) on the basis of the measured temperatures of the temperature sensors 122a to 122c, the parameters, and the delay data.

(S15) The surface temperature estimation unit 135 updates the delay data stored in the delay data storage unit 132 by using the result of the estimation of the surface temperature. When surface temperatures at a plurality of locations are estimated, the surface temperature estimation unit 135 performs steps S14 and S15 per estimation location.

(S16) When surface temperatures at a plurality of locations are estimated in step S14, the heat source control unit 136 selects the maximum surface temperature. The heat source control unit 136 compares the single estimated or selected surface temperature $T_{sur}$ with a predetermined threshold and determines whether the surface temperature $T_{sur}$ is over the threshold. When the surface temperature $T_{sur}$ is over the threshold, the processing proceeds to step S17. Otherwise, the processing proceeds to step S18. Hereinafter, as an example, a case in which the CPU 111a, which is one of the heat sources, is controlled. The heat source control unit 136 controls another heat source such as the charging circuit 124 or the power amplifier 114a.

(S17) The heat source control unit 136 increments the limit step of the CPU 111a by one, to tighten the limit on the arithmetic speed of the CPU 111a. As a result, the clock frequency of the CPU 111a drops, and thus, the amount of heat generated thereby drops. When the limit step is already at its maximum level, the heat source control unit 136 does not change the limit step. In this case, the heat source control unit 136 may drop the operation level of another heat source, instead of the operation level of the CPU 111a. Next, the processing proceeds to step S19.

(S18) The heat source control unit 136 decrements the limit step of the CPU 111a by one, to relax the limit on the arithmetic speed of the CPU 111a. As a result, the clock frequency of the CPU 111a could rise, and thus, the amount of heat generated thereby could rise. When the limit step is already at its minimum level, the heat source control unit 136 does not change the limit step. When $T_{sur}$=threshold, the heat source control unit 136 does not change the limit step, either.

(S19) The temperature measurement unit 133, the outside air temperature estimation unit 134, and the surface temperature estimation unit 135 waits for time Δt (for example, 10 seconds). After time Δt elapses, the processing returns to step S10, and the present processing is performed again.

The mobile terminal apparatus 100 and the design apparatus 200 according to the second embodiment estimates the outside air temperature $T_G$ on the basis of the measured temperatures $T_{s1}$ to $T_{s3}$, the reference temperature $T_{s0}$, the transfer function $X_i(s)$, and the transfer function $H_{ij}(s)$. In addition, the surface temperature $T_{sur}$ of the housing 101 is estimated on the basis of the outside air temperature $T_G$, the measured temperatures $T_{s1}$ to $T_{s3}$, and the transfer function $G_i(s)$.

In this way, even when the reference temperature $T_{s0}$ is increased by a heat source inside the mobile terminal apparatus 100, the surface temperature $T_{sur}$ is accurately estimated. In addition, there is no need to arrange the temperature sensor 122d for measuring the reference temperature $T_{s0}$ at a location sufficiently away from the heat sources. Thus, since the temperature sensor 122d is arranged more freely when the mobile terminal apparatus 100 is designed, downsizing of the mobile terminal apparatus 100 is achieved more easily.

Figure 15:
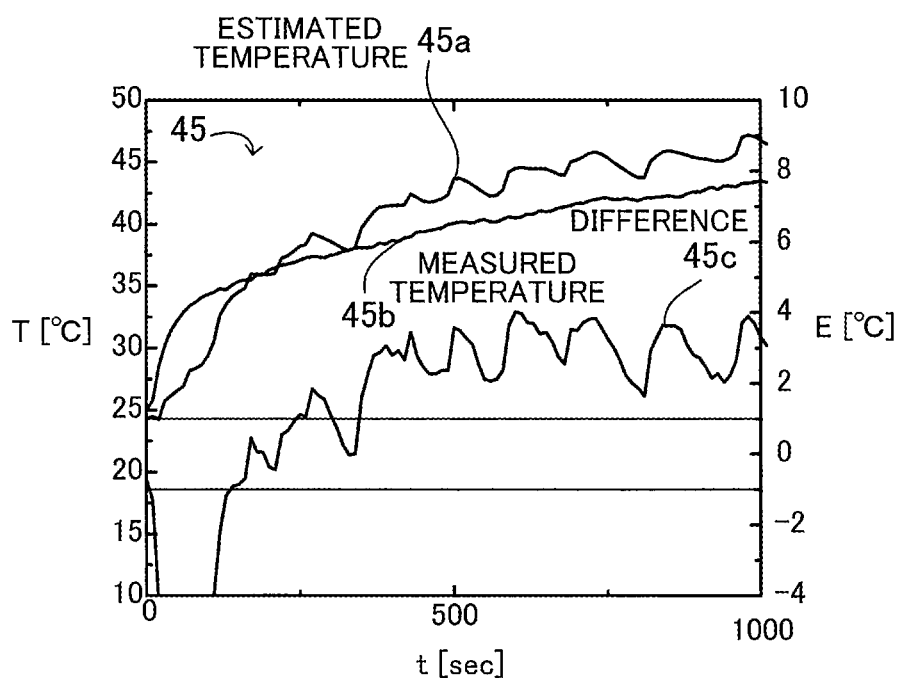
FIG. 15 is a graph illustrating an example of surface temperature estimation processing when a reference temperature is assumed as the outside air temperature.

FIG. 15 is a graph illustrating an example of surface temperature estimation processing when a reference temperature is assumed as the outside air temperature.

A graph 45 indicates an estimated surface temperature, an actual surface temperature, and the difference between the two temperatures. A curve 45a indicates an estimated surface temperature obtained by assuming the reference temperature as the outside air temperature without estimating the outside air temperature. A curve 45b is a surface temperature measured by using the actual mobile terminal apparatus 100 or a sample thereof. A curve 45c indicates the difference between the two temperatures indicated by the respective curves 45a and 45b. As indicated by the curve 45c, in this estimation example, the absolute value of the difference does not fall within 1° C.

Figure 16:
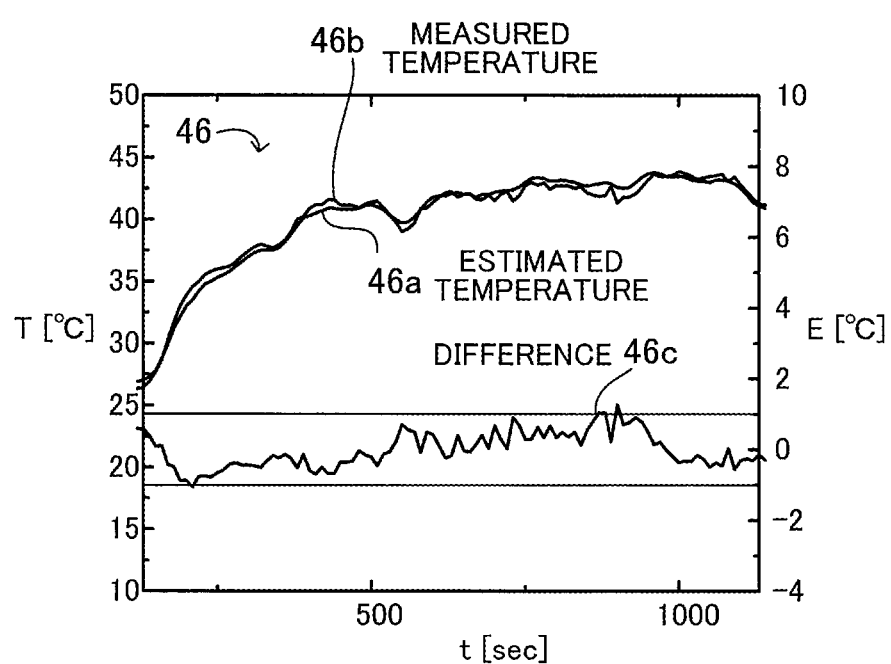
FIG. 16 is a graph illustrating an example of surface temperature estimation processing when the outside air temperature is estimated.

FIG. 16 is a graph illustrating an example of surface temperature estimation processing when the outside air temperature is estimated.

A graph 46 indicates an estimated surface temperature, an actual surface temperature, and the difference between the two temperatures. A curve 46a indicates an estimated surface temperature calculated by using the outside air temperature estimated by using any of the above methods. A curve 46b indicates a surface temperature measured by using the actual mobile terminal apparatus 100 or a sample thereof. A curve 46c indicates the difference between the two temperatures indicated by the respective curves 46a and 46b. As indicated by the curve 46c, in tis estimation example, the absolute value of the difference falls within approximately 1° C.

As described above, the information processing according to the first embodiment is realized by causing the electronic apparatus 10 to execute a program. The information processing according to the second embodiment is realized by causing the mobile terminal apparatus 100 and the design apparatus 200 to execute a program.

The program may be stored in a computer-readable storage medium (for example, the storage medium 120a or 223). Examples of the storage medium include a magnetic disk, an optical disc, an MO, and a semiconductor memory. Examples of the magnet disk include an FD and an HDD. Examples of the optical disc include a CD, a CD-R (Recordable)/RW (Rewritable), a DVD, and a DVD-R/RW. The program may be distributed after the program is stored in a portable storage medium. In this case, the program may be executed after the program is copied from the portable storage medium to another storage medium (for example, the non-volatile memory 113 or the HDD 213).

According to one aspect, the estimation accuracy of the surface temperature of a housing is improved, regardless of the location of a reference temperature sensor on a substrate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An electronic apparatus comprising:
   a housing;
   a substrate that is arranged in the housing;
   a plurality of components that are arranged on the substrate;
   a reference temperature sensor that is arranged on the substrate and acquires a reference temperature;
   a plurality of temperature sensors that are arranged for the plurality of components on the substrate and acquire temperatures, respectively; and
   a processor that estimates an outside air temperature by using the reference temperature, the plurality of temperatures acquired by the plurality of temperature sensors, a plurality of first transfer functions each of which is defined based on a thermal resistance and a thermal time constant from a corresponding one of the plurality of components to the reference temperature sensor, a plurality of second transfer functions each of which is defined based on a thermal resistance and a thermal time constant from a corresponding one of the plurality of components to an individual temperature sensor, and a plurality of third transfer functions each of which is defined based on a thermal resistance and a thermal time constant from a corresponding one of the plurality of components to a surface of the housing and estimates a surface temperature of the housing based on the outside air temperature.

2. The electronic apparatus according to claim 1, wherein the processor estimates the outside air temperature by using the reference temperature, the plurality of temperatures, the plurality of first transfer functions, and the plurality of second transfer functions and estimates the surface temperature by using the outside air temperature, the plurality of temperatures, the plurality of second transfer functions, and the plurality of third transfer functions.

3. The electronic apparatus according to claim 2, wherein the processor calculates a first value from the plurality of temperatures by using the plurality of second transfer functions and the plurality of third transfer functions and estimates the surface temperature by adding a second value based on the outside air temperature to the first value.

4. The electronic apparatus according to claim 2, wherein the processor calculates a first value from the plurality of temperatures by using the plurality of first transfer functions and the plurality of second transfer functions and estimates the outside air temperature based on a difference between a second value based on the reference temperature and the first value.

5. The electronic apparatus according to claim 4,
wherein, when another first value calculated previously is recorded, the processor calculates the first value by referring to the another first value, and
wherein, when the another first value is not recorded, the processor determines an initial value corresponding to the another first value by using at least one of the reference temperature and the plurality of temperatures and calculates the first value by referring to the initial value.

6. The electronic apparatus according to claim 4, further comprising a communication interface that acquires an external reference temperature from an external sensor,
wherein, when another first value calculated previously is recorded, the processor calculates the first value by referring to the another first value, and
wherein, when the another first value is not recorded, the processor determines an initial value corresponding to the another first value by referring to the external reference temperature and calculates the first value by referring to the initial value.

7. A surface temperature estimation method, comprising:
acquiring, by a processor included in an electronic apparatus, a reference temperature by using a reference temperature sensor arranged on a substrate arranged in a housing of the electronic apparatus;
acquiring, by the processor, a plurality of temperatures by using a plurality of temperature sensors arranged on the substrate for a plurality of components, respectively, arranged on the substrate;
estimating, by the processor, an outside air temperature by using the reference temperature, the plurality of temperatures, a plurality of first transfer functions each of which is defined based on a thermal resistance and a thermal time constant from a corresponding one of the plurality of components to the reference temperature sensor, a plurality of second transfer functions each of which is defined based on a thermal resistance and a thermal time constant from a corresponding one of the plurality of components to an individual temperature sensor, and a plurality of third transfer functions each of which is defined based on a thermal resistance and a thermal time constant from a corresponding one of the plurality of components to a surface of the housing; and
estimating, by the processor, a surface temperature of the housing based on the outside air temperature.

8. A non-transitory computer-readable storage medium storing a surface temperature estimation program that causes a processor included in an electronic apparatus to perform a procedure, the procedure comprising:
acquiring a reference temperature by using a reference temperature sensor arranged on a substrate arranged in a housing of the electronic apparatus;
acquiring a plurality of temperatures by using a plurality of temperature sensors arranged on the substrate for a plurality of components, respectively, arranged on the substrate;
estimating an outside air temperature by using the reference temperature, the plurality of temperatures, a plurality of first transfer functions each of which is defined based on a thermal resistance and a thermal time constant from a corresponding one of the plurality of components to the reference temperature sensor, a plurality of second transfer functions each of which is defined based on a thermal resistance and a thermal time constant from a corresponding one of the plurality of components to an individual temperature sensor, and a plurality of third transfer functions each of which is defined based on a thermal resistance and a thermal time constant from a corresponding one of the plurality of components to a surface of the housing; and
estimating a surface temperature of the housing based on the outside air temperature.

* * * * *